(12) United States Patent
Takagi

(10) Patent No.: US 10,592,181 B2
(45) Date of Patent: Mar. 17, 2020

(54) IMAGE FORMING APPARATUS, AND CONTROL METHOD

(71) Applicant: CANON KABUSHIKI KAISHA, Tokyo (JP)

(72) Inventor: Noriko Takagi, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 16/258,244

(22) Filed: Jan. 25, 2019

(65) Prior Publication Data
US 2019/0235815 A1  Aug. 1, 2019

(30) Foreign Application Priority Data

Jan. 30, 2018  (JP) .................................. 2018-013528

(51) Int. Cl.
| | | |
|---|---|---|
| *G06F 3/12* | (2006.01) | |
| *H04N 1/32* | (2006.01) | |
| *H04N 1/00* | (2006.01) | |
| *G06F 21/78* | (2013.01) | |
| *G06F 9/30* | (2018.01) | |

(52) U.S. Cl.
CPC ........ *G06F 3/1273* (2013.01); *G06F 9/30043* (2013.01); *G06F 21/78* (2013.01); *H04N 1/00148* (2013.01); *H04N 1/32545* (2013.01)

(58) Field of Classification Search
CPC .... G06F 3/1273; G06F 9/30043; G06F 21/78; H04N 1/00148; H04N 1/32545
See application file for complete search history.

(56) References Cited

U.S. PATENT DOCUMENTS

| | | | | |
|---|---|---|---|---|
| 2008/0228937 A1* | 9/2008 | Araumi | ............... | H04N 1/00344 709/232 |
| 2010/0106829 A1* | 4/2010 | Mukaiyama | .......... | G06F 3/1203 709/224 |
| 2011/0149344 A1* | 6/2011 | Nakamura | .......... | G06F 11/0733 358/1.15 |
| 2012/0069395 A1* | 3/2012 | Hiraike | ................. | G06F 3/1203 358/1.15 |
| 2014/0325595 A1* | 10/2014 | Shinosaki | ............... | G06F 21/31 726/2 |
| 2015/0281475 A1* | 10/2015 | Nagasaki | ........... | H04N 1/00244 358/1.13 |

FOREIGN PATENT DOCUMENTS

JP  2010-097524 A  4/2010

* cited by examiner

*Primary Examiner* — Moustapha Diaby
(74) *Attorney, Agent, or Firm* — Canon U.S.A., Inc., IP Division

(57) ABSTRACT

An image forming apparatus is provided which stops, in a case where a license is determined to be invalid, periodic transmission of a state notification to a processing server until the license is determined to be valid thereafter. Further, the image forming apparatus does not output a job history that is recorded while the license is invalid to the processing server. The image forming apparatus stops recording a job history in response to the image processing apparatus being unregistered from the processing server.

12 Claims, 16 Drawing Sheets

FIG.6

| | | | |
|---|---|---|---|
| 601 — ATTRIBUTE INFORMATION | JOB HISTORY ID | 00003 | ~6011 |
| | JOB TYPE | PRINT | ~6012 |
| | JOB EXECUTION USER NAME | User001 | ~6013 |
| | JOB START TIME | 2017/6/16 12:09 | ~6014 |
| | JOB EXECUTION DEVICE | PRINTER 02 | ~6015 |
| | PAGE NUMBER | 3 | ~6016 |
| | JOB EXECUTION RESULT | SUCCESSFUL | ~6017 |
| | ... | | |
| 602 — CONTENT INFORMATION | IMAGE DATA | ... | ~6021 |
| | | ... | |
| | | ... | |
| | TEXT DATA | ... | ~6022 |
| | | ... | |
| | | ... | |

FIG.7

| | | | |
|---|---|---|---|
| 701 | SERVER INFORMATION | SERVER URL | http://xxx.co.jp/yyy ~7011 |
| | | SERVER OPERATIONAL STATUS | READY TO COMMUNICATE ~7012 |
| | | ... | |
| | | | |
| | | | |
| | | ... | |
| | | ... | |
| 702 | SETTING INFORMATION | AGENT ID | 00030 ~7021 |
| | | JOB HISTORY TRANSFER SCHEDULE | 21:00 EVERY DAY ~7022 |
| | | NUMBER OF RETRIES | 3 TIMES ~7023 |
| | | RETRY INTERVAL | 15 SECONDS ~7024 |
| | | CAPACITY SHORTAGE WARNING VALUE | 1024 MB ~7025 |
| | | LAST-ACCUMULATED JOB HISTORY | a1b2c3d4 ~7026 |
| | | ... | |
| 703 | STATUS INFORMATION | JOB HISTORY RECORDING STOPPED | |
| | | NEARLY FULL | |
| | | LICENSE INVALID | |
| | | ... | |
| | | ... | |

FIG.11A

| AGENT INFORMATION | AGENT ID | 00030 | ~1101 |
|---|---|---|---|
| | AGENT TYPE | MFP | ~1102 |
| | AGENT VERSION | 1.2 | ~1103 |
| | STATUS INFORMATION | JOB HISTORY RECORDING STOPPED<br><br>NEARLY FULL<br><br>LICENSE INVALID | ~1104 |
| | JOB HISTORY TRANSFER SCHEDULE | 21:00 EVERY DAY | ~1105 |
| | TIME POINT OF PREVIOUS HEARTBEAT RECEPTION | 2017/11/13 14:02 | ~1106 |
| | NEARLY-FULL NOTIFICATION FLAG | DONE | ~1107 |
| | FULL NOTIFICATION FLAG | UNDONE | ~1108 |
| | LICENSE INVALID NOTIFICATION FLAG | DONE | ~1109 |
| | ... | | |

FIG.11B

MANAGEMENT TARGET APPARATUS LIST

| AGENT ID | STATUS INFORMATION | TRANSFER SCHEDULE | ... | DEREGISTRATION |
|---|---|---|---|---|
| 00029 | NORMAL | 24:00 EVERY DAY | ... | DELETE |
| 00030 | JOB HISTORY RECORDING STOPPED<br><br>NEARLY FULL<br><br>LICENSE INVALID | 21:00 EVERY DAY | ... | DELETE |

1201 ... 1202

IMAGE FORMING APPARATUS, AND CONTROL METHOD

BACKGROUND

Field

The present disclosure relates to a control of an image forming apparatus that holds a job execution history.

Description of the Related Art

There has been a conventional job history audit system in which a job execution history (hereinafter, "job history") is stored in a database when an image forming apparatus such as a digital multi-function peripheral executes a job such as a print, copy, or fax transmission/reception job. In the job history audit system, the job history stored in the database can be audited. In the audit, searching the database is performed to refer to the details of a previously-executed jobs, and checking, by a user, a job history list of jobs executed during a specific period (e.g., 24 hours) and notified via an email is performed. The job history can contain image data that is used in executing the job.

A license file with a determined valid period or a license file with an indefinite valid period can be installed into the image forming apparatus. In the image forming apparatus, when the license is in the valid period, the image forming apparatus is managed to perform operations as appropriate.

A function (application) in the image forming apparatus for accumulating job histories in the image forming apparatus and managing the job histories in the job history audit system is also managed by the license. More specifically, the image forming apparatus monitors, when a license file is installed, the valid period of the license, and if the image forming apparatus detects that the valid period of the license expires (the license is invalid), the image forming apparatus performs processing to, for example, stop accumulating job histories.

Japanese Patent Application Laid-Open No. 2010-097524 discusses a technique in which even when the valid period of a license of software operating on a client expires (while the license is invalid), the software collects a use history and failure history from a device such as an image forming apparatus, and if the license of the software is updated, access to the histories collected on the client while the license is invalid is allowed.

In the case in which the valid period of the license of the function (application) in the image forming apparatus for accumulating job histories in the image forming apparatus and managing the accumulated job histories in the job history audit system expires, the application cannot determine whether the user desires to update the license. For example, there are cases in which the user unintentionally forget to conduct an updating operation or the user does not update the license intentionally because the system is to be removed.

The technique discussed in Japanese Patent Application Laid-Open No. 2010-097524 allows access to the job histories acquired from the device and stored while the license is invalid in response to an update of the license. Thus, in the technique discussed in Japanese Patent Application Laid-Open No. 2010-097524, all histories of jobs that occur on the device is transmitted from the device to the client and stored on the client regardless of whether the license is valid or invalid. Thus, in the case in which the user intends to remove the job history audit system as described above, the histories that cannot be accessed are accumulated in the client from the device against the user intention.

SUMMARY OF THE INVENTION

According to an aspect of the present disclosure, an image processing apparatus that executes a job relating to image processing and stores a log indicating a processing content of the job in a storage area of a storage apparatus when the job is executed, includes a memory storing instructions, and at least one processor executing the instructions causing the image processing apparatus to determine whether a license is valid, transmit a notification to a server at a predetermined period or frequency to cause the server to determine an operating state in a case where the license is determined to be valid, output a log of an output target to an external system among logs stored in the storage area in a case where the license is determined to be valid, stop transmitting the notification to the server during a time period from when the license is determined to be invalid to when the license is determined to be valid, and output, to the external system, a log that is not output and is stored in the storage area while the license that has determined to be invalid is valid whereas a log that is stored in the storage area while the license is invalid is not output to the external system in a case where the license is determined to be invalid.

Further features will become apparent from the following description of exemplary embodiments with reference to the attached drawings.

BRIEF DESCRIPTION OF THE DRAWINGS

FIG. 6 is a table illustrating an example of a job history according to the first exemplary embodiment.

FIG. 7 is a table illustrating an example of setting information managed by the image forming apparatus according to the first exemplary embodiment.

FIGS. 11A and 11B are tables respectively illustrating examples of agent information and a management screen of the processing server according to the first exemplary embodiment.

DESCRIPTION OF THE EMBODIMENTS

Various exemplary embodiments will be described below with reference to the drawings.

Figure 1:
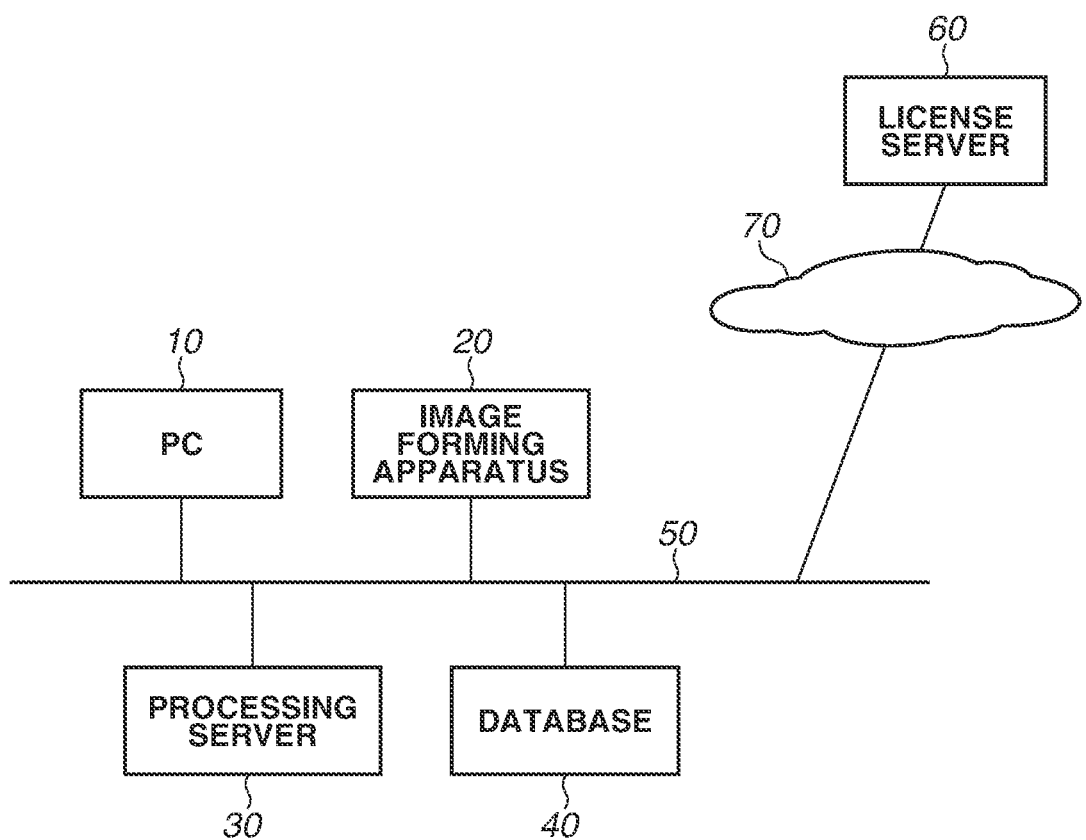
FIG. 1 is a block diagram illustrating an overall configuration of a job history audit system according to a first exemplary embodiment.

FIG. 1 is a block diagram illustrating an overall configuration of a job history audit system according to a first exemplary embodiment of the present invention. In FIG. 1, a personal computer (PC) 10, an image forming apparatus 20, a processing server 30, and a database 40 are connected to a network 50 and can communicate with one another. Further, a license server 60 is connected to the devices on the network 50 via a proxy via the Internet 70 and thus can communicate with the devices on the network 50. While one image forming apparatus 20, one processing server 30, one database 40 are included in the example illustrated in FIG. 1, a plurality of each of the apparatuses may be connected to the network 50. Further, at least one of the functions of the PC 10, the processing server 30, and the database 40 can be configured on the same apparatus.

The PC 10 generates various jobs (job relating to image processing), such as a print job and fax transmission job, to be executed by the image forming apparatus 20 using a printer driver to transmit the generated jobs to the image forming apparatus 20. The job generation and transmission at that time are executed by a user operation via, for example, a user interface (UI). The PC 10, the processing server 30, and the database 40 are configured by a general-purpose PC and the like.

The image forming apparatus 20 is an image processing apparatus having functions such as scan, print, copy, fax, and transmission functions. The image forming apparatus 20 executes a job in response to a user operation and has a job history recording function for storing a job history (log indicating processing details of the job) of an executed job in a storage apparatus at a time of job execution. Further, the image forming apparatus 20 has a function of monitoring a capacity of the storage apparatus configured to record the job history in the job history recording function and a function of managing the valid period of a license. Further, the image forming apparatus 20 has a job history transmission function for transmitting a transmission target job history among the job history stored by the job history recording function to the processing server 30.

Further, the image forming apparatus 20 has a function of transmitting a heartbeat to the processing server 30 in order for the processing server 30 to manage the image forming apparatus 20. The heartbeat is a notification that is transmitted from the image forming apparatus 20 to the processing server 30 at a predetermined period or frequency. The notification is for the processing server 30 to determine an operating state, such as a state in which the image forming apparatus 20 is normally operating or a state in which an agent application for realizing the job history transmission function in the apparatus is enabled and normally operating. If the notification is not received for a predetermined period of time, the processing server 30 determines that at least the agent application is not normally operating, and the processing server 30 can transmit an error notification, to an administrator, for example. Possible causes of non-transmission of a heartbeat from the image forming apparatus 20 to the processing server 30 may be malfunction of the image forming apparatus 20 (especially the network part), the turning off of the power for an unexpectedly long period of time, invalidation of the agent application, and abnormality of the agent application.

In order to realize these functions, the image forming apparatus 20 may be a digital multi-function printer (MFP), a printer, and a scanner, for example.

The processing server 30 receives the job history transmitted from the image forming apparatus 20 by the job history transmission function. The processing server 30 performs data processing on the received job history and transmits the data-processed job history to the database 40. As used herein, the term "data processing" refers to, for example, the processing of performing optical character recognition (OCR) on image data to extract text information and converting the resolution and/or file format of the image data. The text information acquired by the data processing is stored in the database 40 in association with the job history and used for a job history search, for example.

The processing server 30 has a function of receiving a heartbeat and status information from the image forming apparatus 20. The processing server 30 records a time and date of communication in response to the reception of a heartbeat and also records the transmitted information as needed. In a case in which no communication occurs for a predetermined period of time from the time and date of execution of the recorded communication, the processing server 30 determines that the image forming apparatus 20 (especially in the job history transmission function) is in an abnormality state, and provides a notification thereof to the administrator, for example. Further, upon receiving the status information, the processing server 30 updates the status information about the image forming apparatus 20, held in the processing server 30, and if there is a change in the status that can affect the system operation, such as an error, the processing server 30 provides a notification thereof to, for example, the administrator as needed. While the processing server 30 has, for example, an electronic mail notification function as a method for the notification, the notification is not limited to an electronic mail.

The database 40 receives a job history transmitted from the processing server 30 and stores the received job history in the storage apparatus. The database 40 includes a large-capacity storage including one or more hard disk drives (HDDs) and is capable of storing a large number of job histories for a long period of time. A database may be configured in the large-capacity storage of the database 40, or the database 40 can have a file server function.

The network 50 is a connection line for connecting the PC 10, the image forming apparatus 20, the processing server 30, and the database 40 to enable communications with one another, and a local area network (LAN), wide area network (WAN), or wireless communication network is used as the network 50.

The license server 60 is a server configured to manage the license of each apparatus, application, or function, and issues a license thereto. The issued license is installed in the corresponding apparatus, application, or function, and the license server 60 transmits license information in response to a periodic inquiry from the apparatus, application, or function.

For example, the license server 60 issues a license with a valid period to the job history function installed in the image forming apparatus 20. The license issued at this time is installed in the image forming apparatus 20. The image forming apparatus 20 with the license installed therein periodically transmits an inquiry to the license server 60. The license server 60 returns information, such as information about whether the license is valid and information about when the valid period of the license expires, as a response to the inquiry. Alternatively, the image forming apparatus 20 may be configured to manage the license offline by, for example, storing information about the valid period of the license in the storage apparatus of the image forming apparatus 20 instead of periodically accessing the license server 60. Alternatively, instead of the periodic inquiry from the image forming apparatus 20 to the license server 60, the license server 60 may transmit a notification of an event to the image forming apparatus 20 when the valid period of the license expires or is to expire soon.

Figure 2:
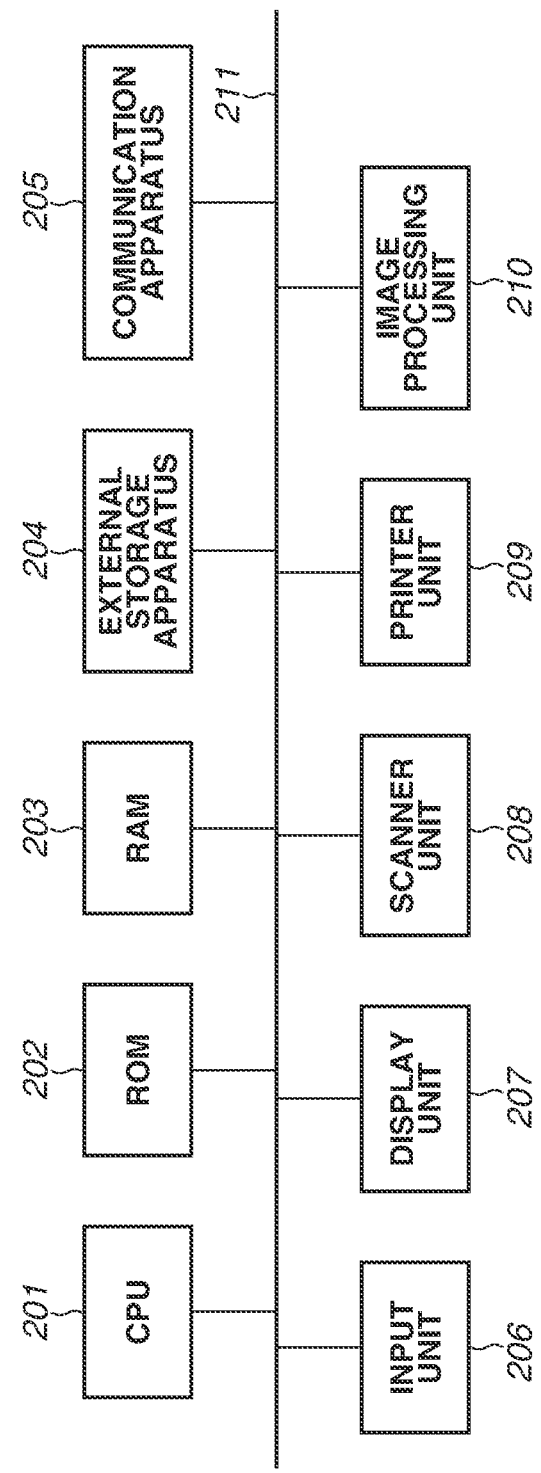
FIG. 2 is a block diagram illustrating a hardware configuration of an image forming apparatus according to the first exemplary embodiment.

FIG. 2 is a block diagram illustrating an example of a hardware configuration of the image forming apparatus 20.

A central processing unit (CPU) 201 reads and executes a program stored in a read-only memory (ROM) 202, an external storage apparatus 204 to comprehensively control the entire image forming apparatus 20 and, for example, controls the units connected to a bus 211 and executes a function such as a print or fax transmission function. The ROM 202 is a dedicated memory for reading data and stores, for example, a basic control program of the image forming apparatus 20. A random access memory (RAM) 203 is a memory from which data is readable and to which data is writable, and is used as, for example, a working memory of the CPU 201.

The external storage apparatus 204 is used as a storage area for storing programs including agent applications according to the present exemplary embodiment, temporary data during execution of a program, and persistent data. For example, an HDD or solid-state drive (SSD) is used as the external storage apparatus 204. The external storage apparatus 204 is lower in data reading/writing speed than the RAM 203 but is capable of storing a large amount of data. The external storage apparatus 204 may include a dedicated storage area for the job history. Further, the external storage apparatus 204 may be a data readable/writable apparatus with an external medium inserted such as a compact disk (CD), a digital versatile disk (DVD), and a memory card.

A communication apparatus 205 is an apparatus configured to connect the image forming apparatus 20 to the network 50. The communication apparatus 205 connects the image forming apparatus 20 to the LAN to enable, for example, Transmission Internet Protocol over Internet Protocol (TCP/IP) data communication with other apparatuses connected to the network 50.

An input unit 206 is an operation unit configured to receive text and data input operations by a user and is, for example, a numeric keypad or hardware key. A display unit 207 is an apparatus configured to display various screens and is, for example, a liquid crystal touch panel. The user inputs an instruction to execute a print or copy function to the image forming apparatus 20 on a user interface screen displayed on the display unit 207 or via the input unit 206.

A scanner unit 208 is configured to optically read a document placed on a document platen and optically read a plurality of document sheets conveyed continuously from an automatic document feeding (ADF) unit at a fixed reading position.

A printer unit 209 is configured to print an image on a recording medium such as a print sheet based on image data. As a configuration for printing, various recording methods, such as an electrophotographic recording method and an inkjet recording method, are applicable. The printer unit 209 of the image forming apparatus 20 executes the copy function by performing printing using the printer unit 209 based on the image data read by the scanner unit 208.

An image processing unit 210 executes various image processing for printing or intended use, such as color space conversion, mapping, binarization, interlacing, and background removal, on the image data acquired from the scanner unit 208 or an external apparatus such as the PC 10. The image data contained in the job history is generated by performing image processing (e.g., reducing the resolution, lowering the image quality, changing the image format) on the image data acquired from an external apparatus using the image processing unit 210.

Figure 3:
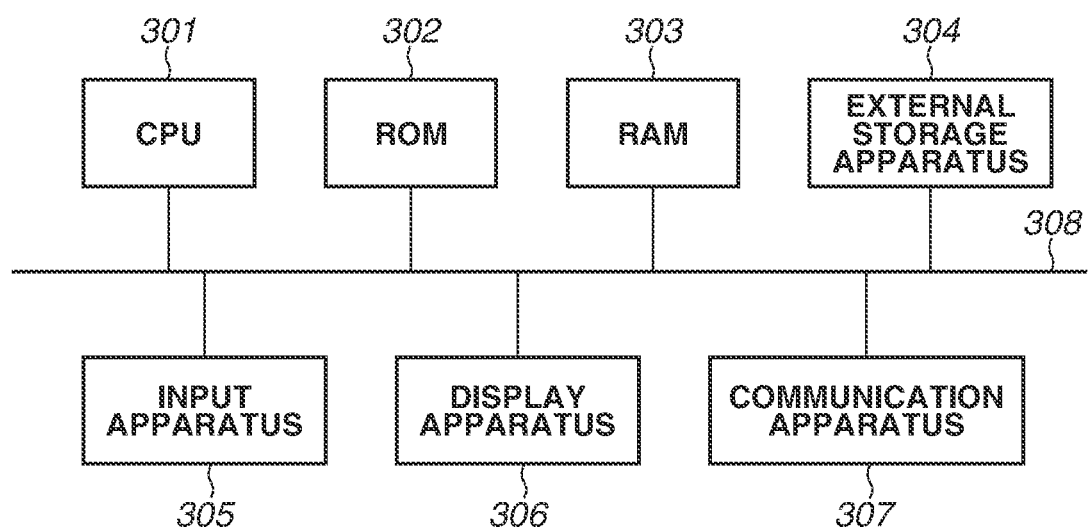
FIG. 3 is a block diagram illustrating a hardware configuration of a processing server according to the first exemplary embodiment.

FIG. 3 is a block diagram illustrating an example of a hardware configuration of an information processing apparatus configuring the PC 10, the processing server 30, the database 40, etc. The hardware configuration illustrated in FIG. 3 corresponds to the hardware configuration of a general information processing apparatus, and the hardware configuration of the general information processing apparatus is applicable to the PC 10 in the present exemplary embodiment.

In FIG. 3, a CPU 301 reads and executes a program stored in a ROM 302 or an external storage apparatus 304 to comprehensively control the entire information processing apparatus and, for example, controls the units connected to a bus 308 to execute various data processing. The ROM 302 is a dedicated memory for data reading and stores, for example, a basic control program of the information processing apparatus. A RAM 303 is a data readable/writable memory and is used as, for example, a working memory of the CPU 301.

The external storage apparatus 304 is used as a storage area for storing an operating system (OS) of the information processing apparatus, temporary data of an application being executed, and persistent data. For example, an HDD or SSD is used as the external storage apparatus 304. The external storage apparatus 304 is lower in data reading/writing speed than the RAM 303 but is capable of storing a large amount of data. Further, the external storage apparatus 304 may be a data readable/writable apparatus with an external medium, such as a CD, DVD, or memory card, inserted.

An input apparatus 305 is an operation unit configured to receive a text and data input operations by the user and is, for example, a keyboard or pointing device. A display apparatus 306 is an apparatus configured to display various screens and is, for example, a cathode ray tube (CRT), liquid crystal monitor, or liquid crystal touch panel. The user inputs an instruction to execute a print job to the image forming apparatus 20 on the user interface screen displayed on the display apparatus 306 or via the input unit 206.

A communication apparatus 307 is an apparatus configured to connect the information processing apparatus to the network 50. The communication apparatus 307 connects the information processing apparatus to the LAN to enable, for example, TCP/IP data communication with the other apparatuses connected to the network 50.

Figure 4:
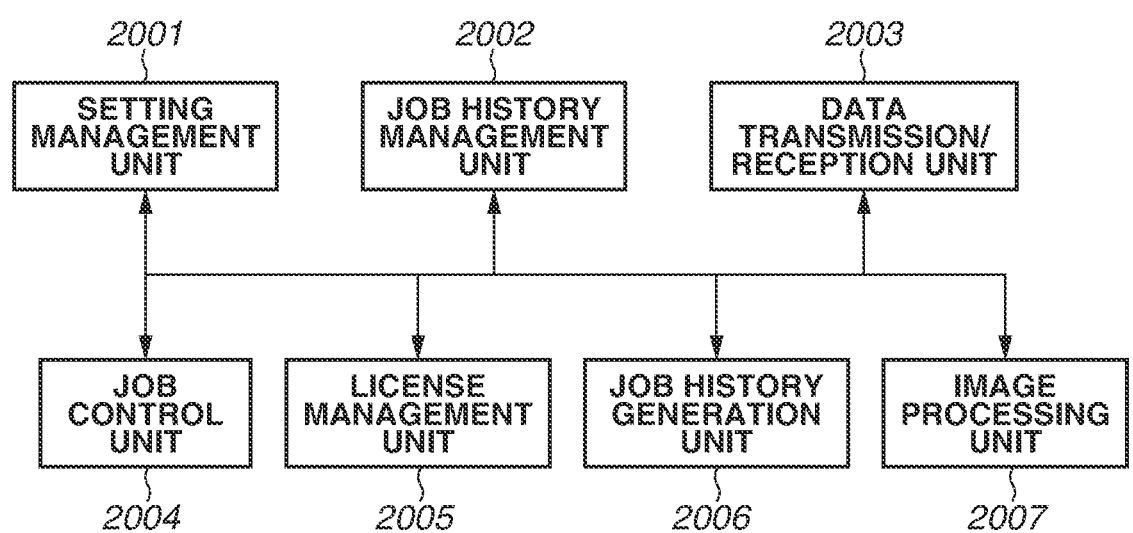
FIG. 4 is a block diagram illustrating a software configuration of an image forming apparatus according to the first exemplary embodiment.

FIG. 4 is a block diagram illustrating an example of a software configuration of the image forming apparatus 20. The CPU 201 reads, for example, one or more programs (e.g., agent application) stored in the external storage apparatus onto the RAM 203 and executes the read program(s) to realize the achieve configuration illustrated in FIG. 4.

A data transmission/reception unit 2003 transmits and receives various data to and from the PC 10 and the processing server 30. The data transmission/reception unit 2003, for example, transmits a heartbeat and a job history generated by a job history generation unit 2006 to the processing server 30 based on the control by a job history management unit 2002.

Further, the data transmission/reception unit 2003 is also capable of receiving a job and a job execution request from the PC 10 besides the control by the job history management unit 2002. Further, the data transmission/reception unit 2003 transmits a license information request to the license server 60 and receives a result.

A setting management unit 2001 stores settings for executing various functions of the image forming apparatus 20 in the storage apparatuses such as the ROM 202, the RAM 203, and the external storage apparatus 204, and reads the stored settings from the storage apparatuses. Examples of the settings include a copy setting for executing the copy function and a print setting for executing the print function. Further, the settings include a setting relating to the operation mode of the image forming apparatus 20. For example, the settings include a setting to generate or not generate a job history at the time of job execution. Further, the settings include various settings described below with reference to FIG. 7, such as access information about the processing server 30 that is to be a job history transmission destination, a job history transfer schedule, and a capacity shortage warning value. The capacity shortage warning value is a threshold value based on which the external storage apparatus 204 determines that the capacity is insufficient.

A job control unit 2004 controls the scanner unit 208 and the printer unit 209 to execute various jobs based on a job execution request input from the input unit 206 or received from the data transmission/reception unit 2003.

A license management unit 2005 manages license information with respect to each function of the image forming apparatus 20. The license management unit 2005 holds access information used to access the license server 60 with which the license information is checked, and periodically transmits an inquiry regarding the validity or valid period of the license to the license server 60. The license management unit 2005 stores the inquiry results in the RAM 203 or the external storage apparatus 204, and if an inquiry is received from the applications or functions, the license management unit 2005 responds to the inquiry with the validity or valid period of the license. Alternatively, a notification of a result of an inquiry to the license server 60 may be transmitted using an event from the license management unit 2005 to the applications or functions.

The job history generation unit 2006 generates a job history after or in parallel with the job execution by the job control unit 2004. In the case in which the job history generation unit 2006 generates a job history, the job history generation unit 2006 may transmit a job history generation notification to the job history management unit 2002 to notify the job history management unit 2002 that the job history is generated. The job history generation unit 2006 transmits, to an image processing unit 2007, a request for executing image processing on the image data contained in the job history. The image processing unit 2007 executes image processing on the image data contained in the job history in response to the request from the job history generation unit 2006. The image processing is the processing of converting the resolution, lowering the image quality, converting the image format, and the like to reduce the image data size.

The job history management unit 2002 stores the job history generated by the job history generation unit 2006 in the external storage apparatus 204. Further, the job history management unit 2002 transmits the job history stored in the external storage apparatus 204 to the processing server 30 via the data transmission/reception unit 2003, as described below with reference to FIGS. 12 to 15. Further, the job history management unit 2002 deletes, from the external storage apparatus 204, the job history that is completely transmitted to the processing server 30. The job history management unit 2002 is a license management target module (function implemented by the agent application). Thus, in the present exemplary embodiment, in the case in which the valid period of the license expires (the license becomes invalid), the control for limiting at least part of the function as the job history audit system using the job history management unit 2002 is implemented. The function as the job history audit system is, for example, a job history audit operation.

Figure 5:
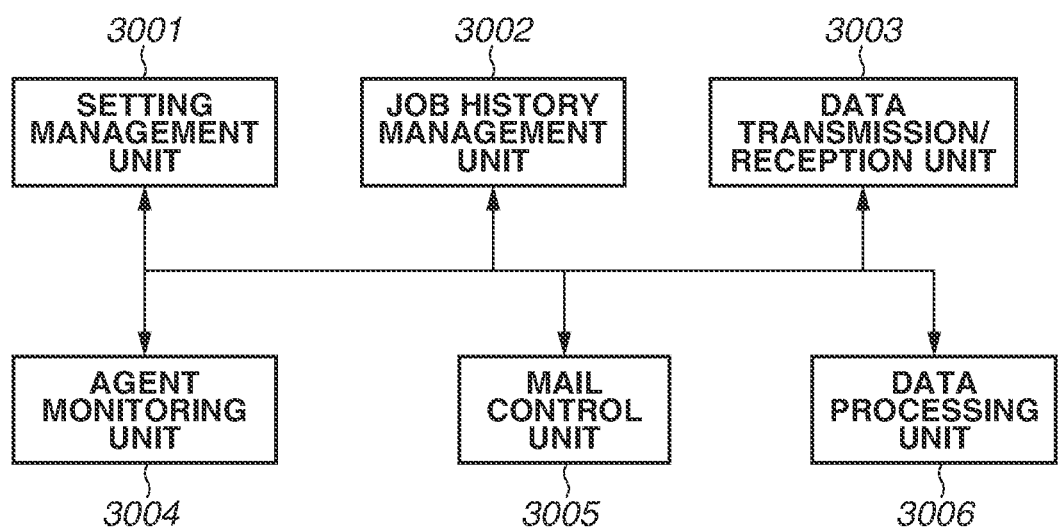
FIG. 5 is a block diagram illustrating a software configuration of the processing server according to the first exemplary embodiment.

FIG. 5 is a block diagram illustrating an example of a software configuration of the processing server 30. The CPU 301 of the processing server 30, for example, reads a program stored in the external storage apparatus 304 onto the RAM 303 and executes the read program to implement the software configuration illustrated in FIG. 5.

A data transmission/reception unit 3003 transmits and receives various data to and from the image forming apparatus 20. The data transmission/reception unit 3003 receives, for example, a heartbeat and a job history from the image forming apparatus 20.

A setting management unit 3001 stores settings relating to the operations of the processing server 30 and settings of the image forming apparatus 20 (management target) in the storage apparatus and reads the stored settings from the storage apparatus. The storage apparatus which is a storage destination is the ROM 302, the RAM 303, or the external storage apparatus 304 of the processing server 30, the external storage apparatus 304 of the database 40. As used herein, the settings relating to the operations of the processing server 30 include a mail notification destination, access information about access to the database 40, and agent monitoring intervals. Further, the settings of the image forming apparatus 20 (management target) include the information illustrated in FIG. 11A described below.

A job history management unit 3002 receives a job history from the image forming apparatus 20 via the data transmission/reception unit 3003, performs data processing on the job history via a data processing unit 3006, and then stores the processed job history in the external storage apparatus 304. The data processing is processing of performing OCR processing on the image data to extract text information or converting a resolution or file format of the image data. The text information acquired through the data processing is stored in association with the job history and used for a job history search. Further, the job history management unit 3002 transmits a job history and text information to the database 40 via the data transmission/reception unit 3003. The job history management unit 3002 deletes, from the external storage apparatus 304, the job history and the text information that are completely transmitted to the database 40.

An agent monitoring unit 3004 monitors a heartbeat transmitted periodically from the image forming apparatus 20 (management target), and monitors whether the image forming apparatus 20 is operating normally. More specifically, the agent monitoring unit 3004 checks the reception time of the previous heartbeat via the setting management unit 3001, and checks whether the difference from the current time exceeds a predetermined length of time. If the predetermined length of time is exceeded, the agent monitoring unit 3004 determines that the image forming apparatus 20 is in an abnormal state, and transmits a notification thereof to the administrator via a mail control unit 3005. Further, the agent monitoring unit 3004 checks the status of the image forming apparatus 20 (management target) via the setting management unit 3001, and if an error or capacity shortage occurs, the agent monitoring unit 3004 transmits a notification thereof to the administrator via the mail control unit 3005.

The mail control unit 3005 transmits an electronic mail as the notification to the administrator. The data processing unit 3006 performs OCR processing on the image data to extract text information or converts the resolution or file format of the image data.

FIG. 6 illustrates an example of the job history to be transmitted from the job history management unit 2002 of the image forming apparatus 20 to the processing server 30.

As illustrated in FIG. 6, the job history contains attribute information 601 relating to the job execution, and content information 602 about the job execution target.

The attribute information 601 includes information about, for example, a job history identifier (job history ID) 6011, a job type 6012, a job execution user name 6013, a job start time 6014, a job execution device 6015, a page number 6016, and a job execution result 6017.

The job history ID 6011 is identification information for identifying the job history.

The job type 6012 indicates a job type corresponding to the job history ID 6011 and is, for example, copy or print.

The job execution user name 6013 is a name of the user who issues an instruction to execute the job corresponding to the job history ID 6011.

The job start time 6014 indicates a time, date, month, and year of starting execution of the job corresponding to the job history ID 6011. The job start time 6014 corresponds to, for example, a time at which a print job is temporarily stored in a queue and then read from the queue to execute in a case in which the image forming apparatus 20 receives the print job from an external apparatus.

The job execution device 6015 indicates a name of device that executes the job corresponding to the job history ID 6011 and, in FIG. 6, "printer 02" (corresponding to the image forming apparatus 20) is specified. As described above, the job history is transmitted to the processing server 30. As a result, the processing server 30 receives job histories from a plurality of the image forming apparatuses 20 connected to the network 50 and manages the job histories. At this time, the processing server 30 can manage the job history of each image forming apparatus using the information about the "job execution device".

The page number 6016 indicates a number of pages of the job execution target corresponding to the job history ID 6011. The page number 6016 may be a logical number of pages corresponding to a predetermined image unit or a physical number of pages based on the recording medium.

The job execution result 6017 indicates a result of job execution corresponding to the job history ID 6011.

The content information 602 includes information about image data 6021 and text data 6022 on the job execution target corresponding to the job history ID 6011. The information is, for example, the storage location of the image data 6021 or the text data 6022 in the external storage apparatus 204. Further, the content information 602 includes content information for the number of pages specified by the attribute information 601.

The example of the job history in FIG. 6 indicates that the user "User001" executed a job of "printing" a document of "three pages" with "printer 02" at "12:09, June 16, 2017". The example also indicates that the execution result is "successful (printing successful)".

Regarding the job history illustrated in FIG. 6, there are cases in which not a single job history but a plurality of job histories corresponds to a single job. In such cases, for example, a common job history ID may be assigned to the job histories corresponding to the same job. Alternatively, a sub number may be added to the job history ID 6011 to indicate that the job histories correspond to the same job.

FIG. 7 illustrates an example of setting information managed by the setting management unit 2001 of the image forming apparatus 20. As illustrated in FIG. 7, the setting information managed by the setting management unit 2001 includes server information 701 indicating the job history transmission destination, setting information 702 relating to the job history function, and status information 703 relating to the job history function.

For example, the server information 701 includes a server universal resource locator (URL) 7011 and a server operational status 7012. These pieces of information are to be input by the user via the input unit 206 via a screen (not illustrated) displayed on the display unit 207 so that the image forming apparatus 20 is registered in the processing server 30. Alternatively, the information may be input to the image forming apparatus 20 through setting information distribution processing performed by an external application.

The server URL 7011 is, for example, a URL of a web service of the processing server 30 or a folder path set to be shared. In the case of the folder path, an access user name (not illustrated) and password (not illustrated) also need to be recorded as part of the server information.

Further, the setting information 702 includes an agent ID 7021, a job history transfer schedule 7022, a number-of-retries 7023 and a retry interval 7024 in the cases of unsuccessful transmission, a capacity shortage warning value 7025, and a "last-accumulated job history" 7026.

The agent ID 7021 is an ID that is issued by the processing server 30 in a case in which the image forming apparatus 20 is registered in the processing server 30. In a case in which the image forming apparatus 20 and the processing server 30 are connected via the license server 60, an authentication server (not illustrated), the agent ID 7021 may be an ID issued by the license server 60 or the authentication server.

The job history transfer schedule 7022 is a transfer schedule setting for transmitting a job history from the image forming apparatus 20 to the processing server 30. In FIG. 7, the job history management unit 2002 starts transmitting a job history stored in the external storage apparatus 204 to the processing server 30 via the data transmission/reception unit 2003 at "21:00 every day". If the transmission to the processing server 30 is unsuccessful, the transmission is retried after "15 seconds" set as the retry interval 7024. The transmission is retried up to "three times" set as the number-of-retries 7023.

The capacity shortage warning value 7025 is a setting for providing a notification to the administrator in a case in which the free space of the external storage apparatus 204 storing the job history becomes smaller than a predetermined threshold value, and a value corresponding to the threshold value is set as the capacity shortage warning value 7025. In the example illustrated in FIG. 7, a notification is provided to the administrator if the free space of the external storage apparatus 204 becomes smaller than "1024 MB".

The "last-accumulated job history" 7026 is information that is stored in the external storage apparatus 204 and is for identifying the latest job history stored in the external storage apparatus 204 in a case of detecting the state "license invalid" in step S811 in FIG. 8 described below. In the present exemplary embodiment, the job history ID "a1b2c3d4" is stored as an example.

Further, the status information 703 includes information 7031 about whether the job history recording function is stopped, status 7032 of capacity shortage of the external storage apparatus 204, and license status 7033. For example, in the example illustrated in FIG. 7, the job history generation function at the time of job execution is stopped (job history recording stopped), the capacity of the external storage apparatus 204 is nearly insufficient and, furthermore, the valid period of the license expires (license invalid).

The processes of the image forming apparatus 20 according to the present exemplary embodiment will be described with reference to the flowcharts in FIGS. 8, 9, 12, and 13. The CPU 201 of the image forming apparatus 20 reads a program, for example, stored in the ROM 202 onto the RAM 203 and executes the read program to implement processing in the flowcharts.

Figure 8:
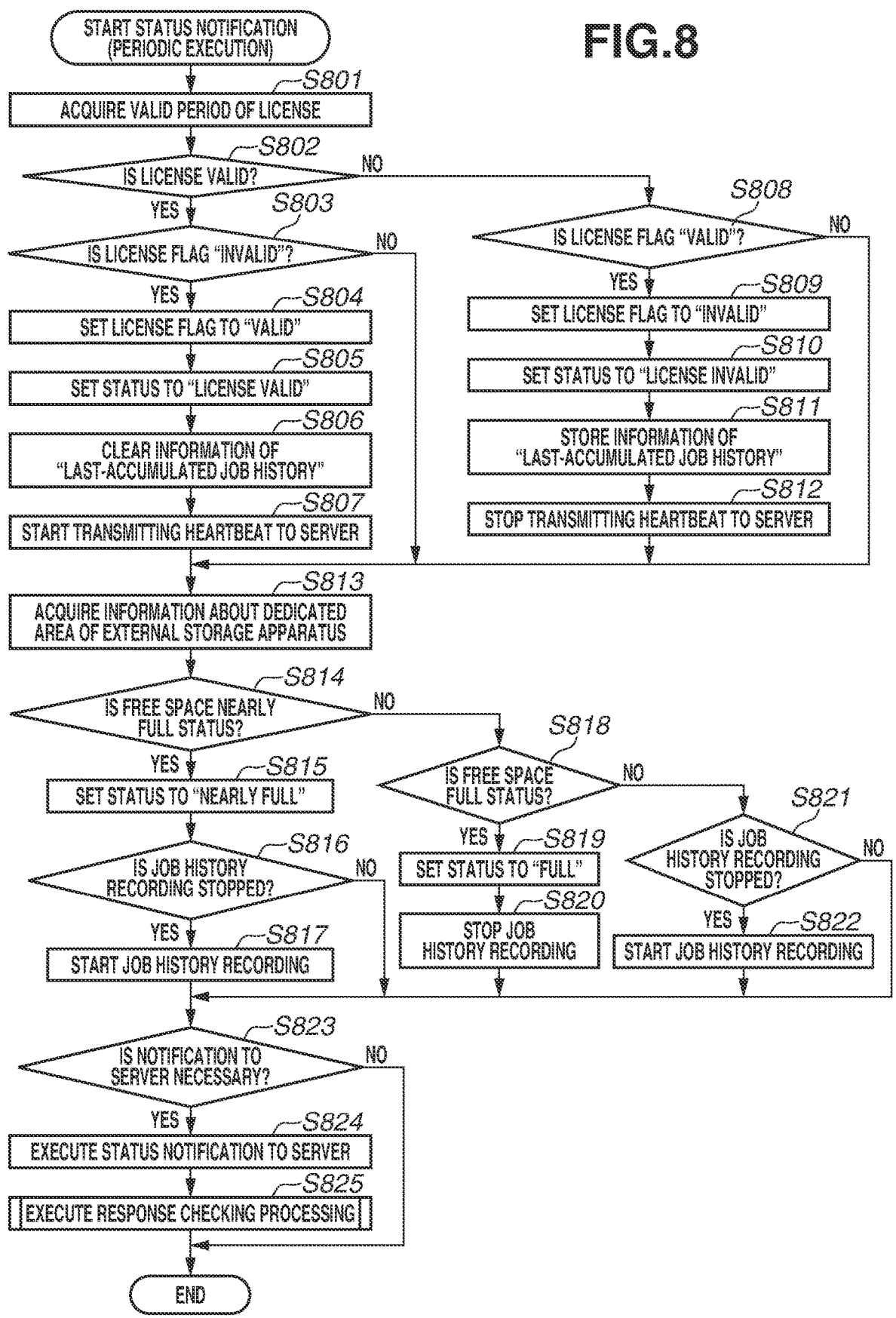
FIG. 8 is a flowchart illustrating status notification processing performed by the image forming apparatus according to the first exemplary embodiment.

FIG. 8 is a flowchart illustrating an example of status notification processing in which the job history management unit 2002 of the image forming apparatus 20 checks the state of the image forming apparatus 20 relating to the job history function and transmits a result of the checking to the processing server 30.

In the job history audit system in the present exemplary embodiment, the image forming apparatus 20 temporarily accumulates a job history in a dedicated reserved area of the external storage apparatus 204 and executes the processing at a predetermined timing to transmit the job history to the processing server 30. Further, the image forming apparatus 20 monitors the capacity of the reserved area used and the free space, and if the free space is likely to become insufficient soon, the image forming apparatus 20 provides a warning to the administrator. Further, the job execution by the image forming apparatus 20 may be restricted in a case of insufficient capacity of the external storage apparatus 204.

While this processing is to be executed periodically, the processing may be executed in response to an external instruction (e.g., a user instruction received via the input unit 206, or an instruction from the processing server 30 via the data transmission/reception unit 2003).

First, in step S801, the job history management unit 2002 transmits an inquiry to the license management unit 2005 to acquire information about the valid period of the license.

Next, in step S802, the job history management unit 2002 checks the information about the valid period of the license that is acquired in step S801, and determines whether the license is in an invalid state, such as the state in which the license is not installed or the valid period of the license has already expired.

In step S802, if the job history management unit 2002 determines that the license is valid (YES in step S802), the processing proceeds to step S803.

In step S803, the job history management unit 2002 checks whether a license flag (not illustrated) is "invalid". The license flag is information that is stored in the RAM 203 or the external storage apparatus 204 by the job history management unit 2002 via the setting management unit 2001. The license flag is changed in step S804 or S809 described below.

In step S803, if the job history management unit 2002 determines that the license flag is "valid" (NO in step S803), the processing proceeds to step S813.

On the other hand, in step S803, if the job history management unit 2002 determines that the license flag is "invalid" (YES in step S803), the processing proceeds to step S804.

In step S804, the job history management unit 2002 sets the license flag value to "valid" and stores the set license flag value in the RAM 203 or the external storage apparatus 204.

Further, in step S805, the job history management unit 2002 sets the status 703 (FIG. 7) managed by the setting management unit 2001 to "license valid".

Further, in step S806, the job history management unit 2002 clears the "last-accumulated job history" 7026 (FIG. 7) of the setting information 702 managed by the setting management unit 2001. The "last-accumulated job history" 7026 is information to be stored in step S811 described below.

Figure 13:
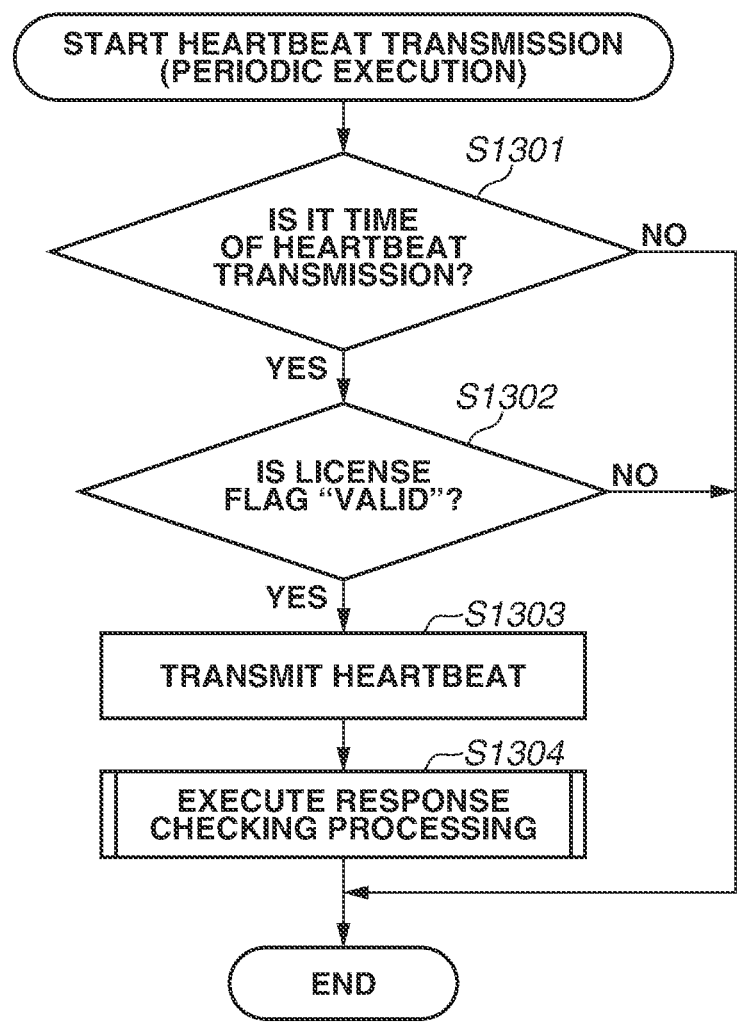
FIG. 13 is a flowchart illustrating heartbeat transmitting processing performed by the image forming apparatus according to the first exemplary embodiment.

Further, in step S807, the job history management unit 2002 starts transmitting a heartbeat to the processing server 30. More specifically, the function of executing a process of transmitting a heartbeat in response to an instruction from the job history management unit 2002 to the data transmission/reception unit 2003 as illustrated in FIG. 13 is started. In some exemplary embodiments, whether the process of transmitting a heartbeat is already started needs to be checked in advance, but this is omitted in the present exemplary embodiment. Following the processing in step S807, the processing proceeds to step S813.

Further, in step S802, if the job history management unit 2002 determines that the license is invalid (NO in step S802), the processing proceeds to step S808.

In step S808, the job history management unit 2002 checks whether the license flag is "valid".

If the job history management unit 2002 determines that the license flag is "invalid" (NO in step S808), the processing proceeds to step S813.

On the other hand, in step S808, if the job history management unit 2002 determines that the license flag is "valid" (YES in step S808), the processing proceeds to step S809.

In step S809, the job history management unit 2002 sets the license flag value to "invalid" and stores the set license flag value in the RAM 203 or the external storage apparatus 204.

Further, in step S810, the job history management unit 2002 sets the status 703 (FIG. 7) to "license invalid".

Further, in step S811, the job history management unit 2002 stores information about the last-stored job history (job history of a job that is most recently executed) that is currently stored in the external storage apparatus 204 as the "last-accumulated job history" 7026 (FIG. 7) in the external storage apparatus 204 via the setting management unit 2001. The job history information to be stored in the "last-accumulated job history" 7026 is expected to be a job history ID but can be any information from which the job history that is already stored before the job history management unit 2002 detects that the license is invalid is identifiable. For example, the information can be a combination of values of a plurality of items of the attribute information 601 in FIG. 6 or the name or the time and date of an update of the file stored as the job history.

Further, in step S812, the job history management unit 2002 stops transmitting a heartbeat to the processing server 30. More specifically, the function of executing a process of transmitting a heartbeat in FIG. 13 described below which is performed in response to an instruction from the job history management unit 2002 to the data transmission/reception unit 2003 is stopped. In other words, the job history management unit 2002 stops transmitting a heartbeat in a case in which the license is determined to be invalid. Further, the job history management unit 2002 starts transmitting a heartbeat in a case in which the license is determined to be valid.

Following the processing in step S812, the processing proceeds to step S813.

In step S813, the job history management unit 2002 acquires a free space of the external storage apparatus 204 via the setting management unit 2001. Alternatively, the job history management unit 2002 can check the total size of the job history stored in the external storage apparatus 204.

Next, in step S814, the job history management unit 2002 determines whether the free space is in a nearly-full status, by checking whether the free space of the external storage apparatus 204 that is acquired in step S813 is smaller than or equal to the capacity shortage warning value 7025 (FIG. 7) and larger than the minimum space. The minimum space indicates a predetermined capacity that is smaller than the minimum required capacity for recording a job history and is determined in advance.

In step S814, if the free space of the external storage apparatus 204 is smaller than or equal to the capacity shortage warning value 7025 and larger than the minimum space, the job history management unit 2002 determines that the free space is in the nearly-full status (YES in step S814), and the processing proceeds to step S815.

In step S815, the job history management unit 2002 sets the status 703 (FIG. 7) to "nearly full".

Next, in step S816, the job history management unit 2002 checks whether the job history generation function is stopped. The job history generation function is a setting to or not to generate a job history at the time of job execution. The setting is set via the setting management unit 2001, and the job control unit 2004 may check whether the setting is changed at the time of job execution. Alternatively, the job control unit 2004 may read the setting at the timing of reactivation of the image forming apparatus 20 and determine whether to generate a job history at the time of job execution.

If the job history management unit 2002 determines that the job history generation function is stopped (YES in step S816), the processing proceeds to step S817.

In step S817, the job history management unit 2002 starts the job history generation function. To start the job history generation function is to set the setting so that a job history is generated at the time of job execution. Further, the job history management unit 2002 sets the status 703 (FIG. 7) managed by the setting management unit 2001 to "job history recording started".

Following the processing in step S817, the processing proceeds to step S823.

On the other hand, in step S816, if the job history management unit 2002 determines that the job history generation function is not stopped (i.e., the job history generation function is started) (NO in step S816), the processing proceeds to step S823.

Further, in step S814, if the free space of the external storage apparatus 204 is larger than the capacity shortage warning value 7025 or equal to or smaller than the minimum space, the job history management unit 2002 determines that the free space is not in the nearly-full status (NO in step S814), and the processing proceeds to step S818.

In step S818, the job history management unit 2002 determines whether the free space is in a full status by checking whether the free space of the external storage apparatus 204 that is acquired in step S813 is zero or the minimum. If the free space is zero or the minimum space, the job history management unit 2002 determines that the free space is in the full status (YES in step S818), and the processing proceeds to step S819.

In step S819, the job history management unit 2002 sets the status 703 (FIG. 7) to "full".

Next, in step S820, the job history management unit 2002 stops the job history generation function. To stop the job history generation function is to set the setting so that a job history is not generated at the time of job execution. Further, the job history management unit 2002 sets the status 703 (FIG. 7) managed by the setting management unit 2001 to "job history recording stopped".

Following the processing in step S820, the processing proceeds to step S823.

Further, in step S818, if the free space is neither zero nor the minimum space, the job history management unit 2002 determines that the free space is not in the full status (NO in step S818), and the processing proceeds to step S821.

In step S821, the job history management unit 2002 checks whether the job history generation function is stopped, as in step S816. If the job history management unit 2002 determines that the job history generation function is stopped (YES in step S821), the processing proceeds to step S822.

In step S822, the job history management unit 2002 starts the job history generation function, as in step S817. Further, the job history management unit 2002 sets the status 703 (FIG. 7) managed by the setting management unit 2001 to "job history recording started".

Following the processing in step S822, the processing proceeds to step S823.

On the other hand, in step S821, if the job history management unit 2002 determines that the job history generation function is not stopped (i.e., the job history generation function is started) (NO in step S821), the processing proceeds to step S823.

In step S823, the job history management unit 2002 determines whether a notification of the checked state of the image forming apparatus 20 regarding the job history function needs to be transmitted to the processing server 30. If the state checked at least in steps S801 to S822 is different from the state of which the processing server 30 is notified, the job history management unit 2002 determines that the notification is necessary to be transmitted. An item (not illustrated) other than the items specified in steps S801 to S822 may be included as the information included in the state.

If the job history management unit 2002 determines that a notification to the processing server 30 is necessary (YES in step S823), the processing proceeds to step S824.

In step S824, the job history management unit 2002 executes status notification to the processing server 30. The status notification is the processing of transmitting information about the state of the image forming apparatus 20 that is used as a determination condition in step S823 to the processing server 30 via the data transmission/reception unit 2003. The transmitted data includes at least information for identifying the image forming apparatus 20 besides the information indicating the state of the image forming apparatus 20. A specific example of information for identifying the image forming apparatus 20 is the agent ID 7021 illustrated in FIG. 7. Further, the job history management unit 2002 receives a response thereto from the processing server 30.

Next, in step S825, the job history management unit 2002 checks the response received from the processing server 30 via the data transmission/reception unit 2003 in step S824. Details of the processing will be described below with reference to FIG. 9.

On the other hand, in step S823, if the job history management unit 2002 determines that a notification to the processing server 30 is unnecessary (NO in step S823), the job history management unit 2002 ends the processing of the flowchart in FIG. 8.

Figure 9:
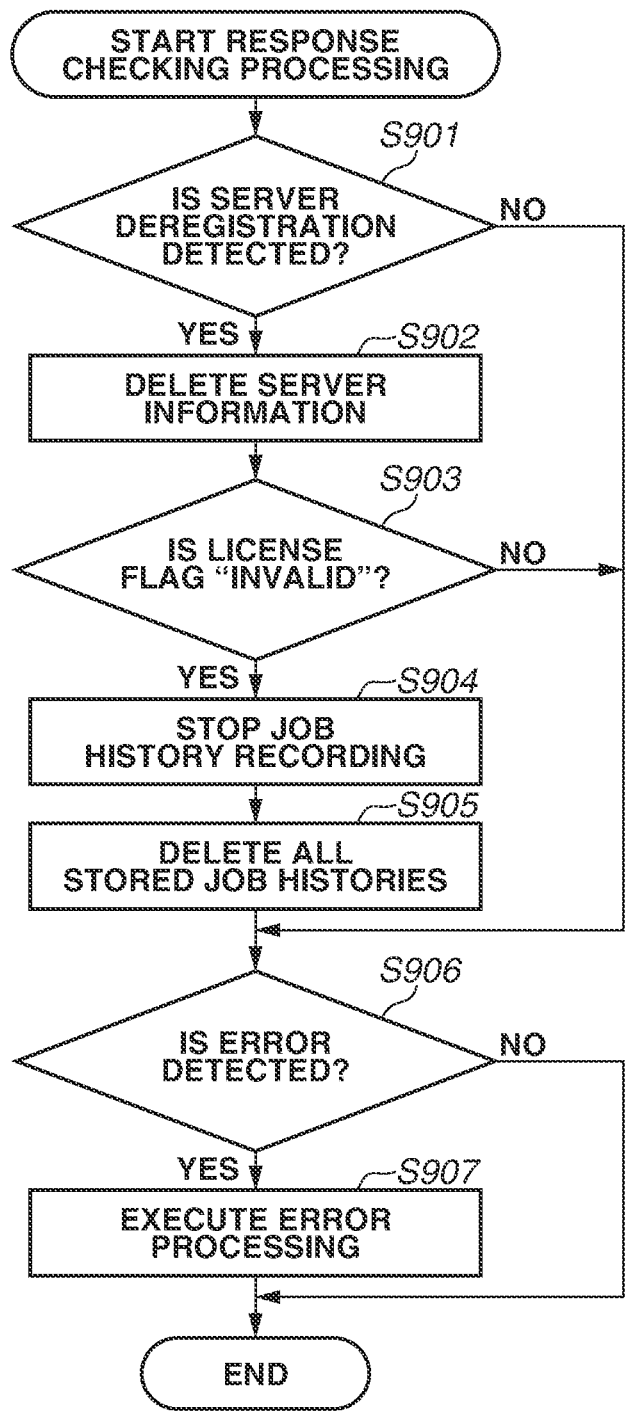
FIG. 9 is a flowchart illustrating response checking processing performed by the image forming apparatus according to the first exemplary embodiment.

FIG. 9 is a flowchart illustrating an example of processing of checking the details of the response received from the processing server 30 by the image forming apparatus 20 in step S825 in FIG. 8.

In the job history audit system in the present exemplary embodiment, the image forming apparatus 20 is capable of detecting the deletion (deregistered) of the image forming apparatus 20 from the management target on the processing server 30. If the image forming apparatus 20 detects the deletion, the image forming apparatus 20 stops accumulating the job history and deletes the server information.

In step S901, the job history management unit 2002 determines whether the response received from the processing server 30 via the data transmission/reception unit 2003 contains server deregistration information (i.e., information about whether server deregistration is detected). For example, the response is received as an error code such as a numerical value defined in such a manner that, for example, the values "0", "1", and "2" are respectively defined as "communication successful", "server deregistration", and "authentication unsuccessful". Alternatively, text strings such as "communication successful" and "server deregistration" can be used for the definition. The server deregistration indicates that, for example, the user performs removal from the management target on the management screen of the image forming apparatus 20 on the processing server 30. More specifically, the server deregistration indicates that the user presses an "delete" button illustrated in FIG. 11B described below and the setting management unit 3001 of the processing server 30 deletes the agent information file illustrated in FIG. 11A from the RAM 303, the external storage apparatus 304, or the database 40.

In step S901, if the job history management unit 2002 determines that the response received from the processing server 30 via the data transmission/reception unit 2003 does not contain server deregistration information (i.e., server deregistration is not detected) (NO in step S901), the processing proceeds to step S906.

On the other hand, in step S901, if the job history management unit 2002 determines that the response received from the processing server 30 via the data transmission/reception unit 2003 contains server deregistration information (i.e., server deregistration is detected) (YES in step S901), the processing proceeds to step S902.

In step S902, the job history management unit 2002 deletes the server information from the setting information stored in the external storage apparatus 204 via the setting management unit 2001. More specifically, the values of the server information 701 including the server URL 7011 and the server operational status 7012 among the setting information illustrated in FIG. 7 are emptied.

Next, in step S903, the job history management unit 2002 checks whether the license flag set in step S804 or S809 in FIG. 8 is "valid". In the present exemplary embodiment, the license flag is checked in this processing because the processing server to be a connection destination is likely to be changed in the case in which the license is "valid". In another exemplary embodiment, the processing can be configured in such a manner that execution of steps S904 and S905 described below is required regardless of whether the license is valid or invalid. In this configuration, processing in steps S904 and S905 are executed without executing the processing in step S903.

In step S903, if the job history management unit 2002 determines that the license flag is "valid" (NO in step S903), the processing proceeds to step S906.

On the other hand, in step S903, if the job history management unit 2002 determines that the license flag is "invalid" (YES in step S903), the processing proceeds to step S904.

In step S904, the job history management unit 2002 stops the job history generation function, as in step S820 in FIG. 8. Further, the job history management unit 2002 sets the status 703 (FIG. 7) managed by the setting management unit 2001 to "job history recording stopped". The image forming apparatus 20 in the present exemplary embodiment continues the job history recording until the server registration is deregistered even in the case in which the license becomes invalid.

Further, in step S905, the job history management unit 2002 deletes all job histories stored in the external storage apparatus 204. In this way, the job history accumulated while the valid period of the license expires is automatically deleted. If, however, it is generally considered that the job history is to be deleted temporarily from the processing server 30 depending on the operation of the system, the stored job history may not be deleted but maintained in step S905. Further, a screen to prompt the user to select whether to delete the job history may be displayed on the display unit 207, and whether to delete the job history may be determined according to an instruction from the input unit 206.

Following the processing in step S905, the processing proceeds to step S906.

In step S906, the job history management unit 2002 checks whether any other error is contained (i.e., error is detected) in the response received from the processing server 30 via the data transmission/reception unit 2003.

If the job history management unit 2002 determines that the response contains an error (error is detected) (YES in step S906), the processing proceeds to step S907. In step S907, the job history management unit 2002 executes error processing, and the job history management unit 2002 ends the processing of the flowchart in FIG. 9.

On the other hand, in step S906, if the job history management unit 2002 determines that the response from the processing server 30 does not contain any error (no error is detected) (NO in step S906), the job history management unit 2002 ends the processing in the flowchart in FIG. 9.

Figure 10:
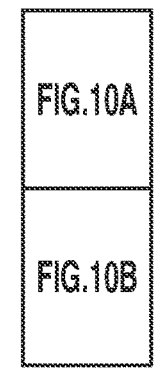
FIG. 10 (consisting of FIGS. 10A and 10B) is a flowchart illustrating status notification reception processing performed by the processing server according to the first exemplary embodiment.
Figure 10A:
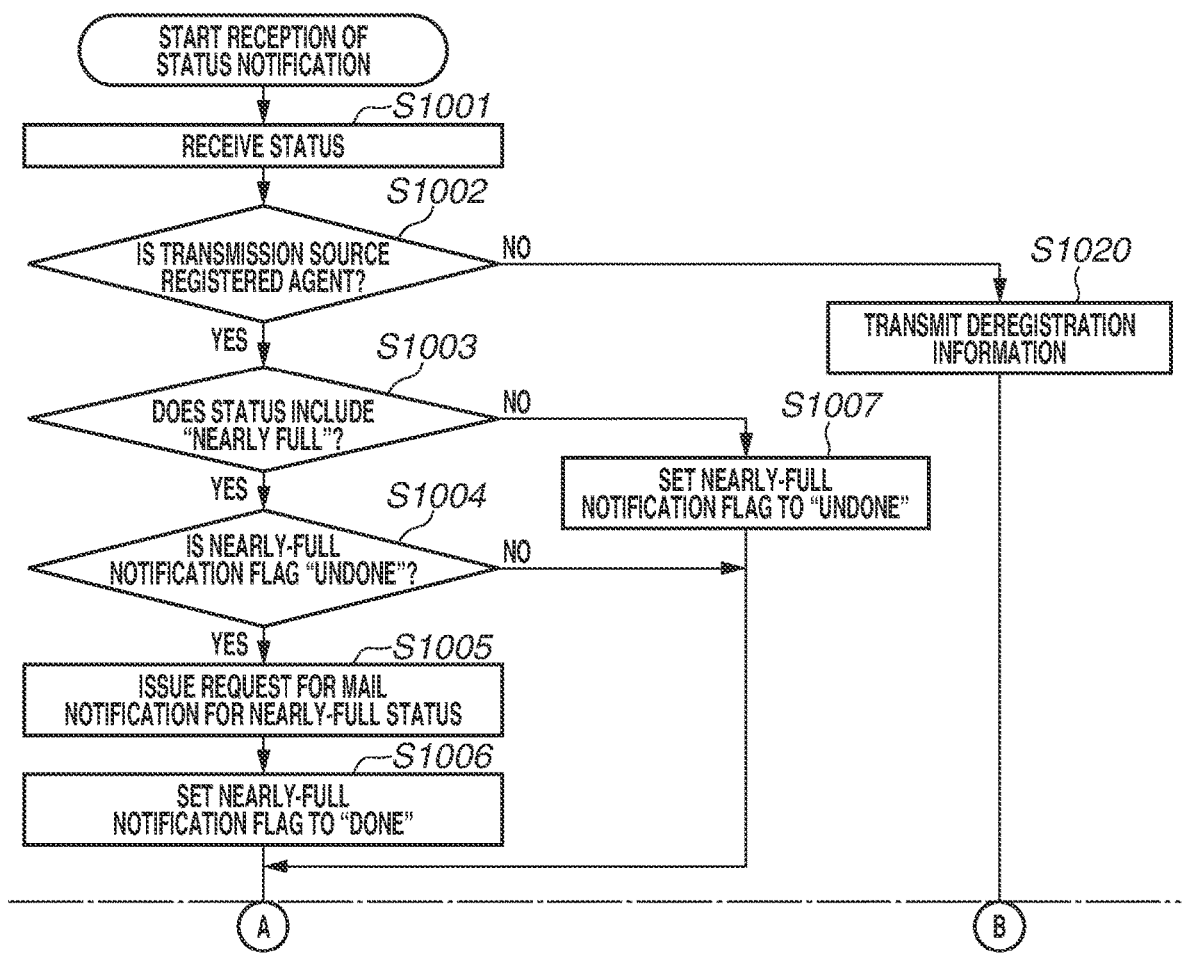
Figure 10B:
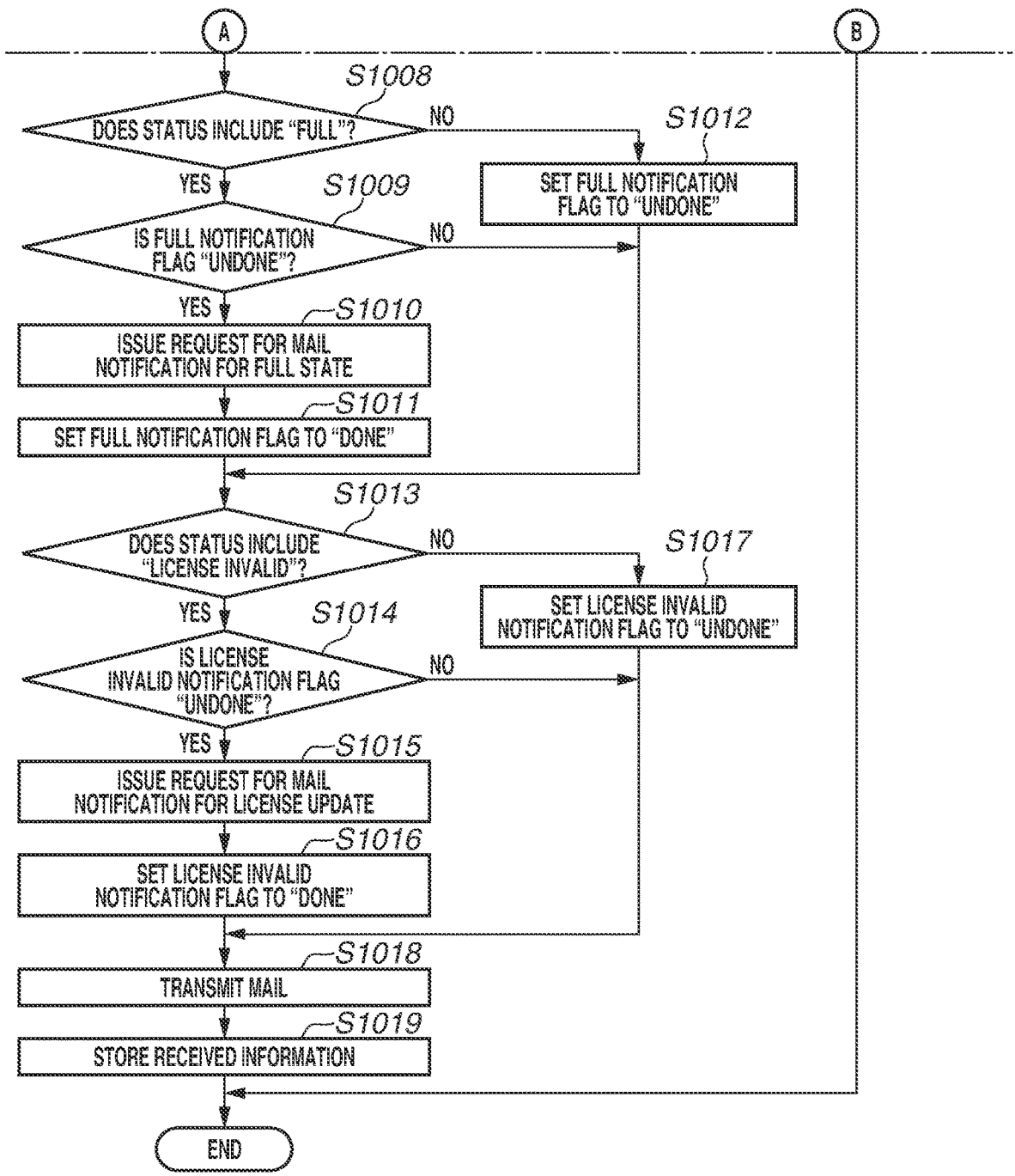

FIG. 10 (consisting of FIGS. 10A and 10B) is a flowchart illustrating an example of processing of status notification reception in which the processing server 30 receives a status notification (e.g., step S824) transmitted from the job history management unit 2002 in FIG. 8 via the data transmission/reception unit 2003. The CPU 301 of the processing server 30, for example, reads a program stored in the external storage apparatus 304 onto the RAM 303 and executes the program to realize the process. Further, the data transmission/reception unit 3003 of the processing server 30 receives data communication from the data transmission/reception unit 2003 of the image forming apparatus 20 to execute the processing.

In step S1001, the agent monitoring unit 3004 receives a status notification from the image forming apparatus 20 via the data transmission/reception unit 3003 and stores the received data in the RAM 303 or the external storage apparatus 304. As in step S824 in FIG. 8, the received data contains at least the information for identifying the image forming apparatus 20 besides the information indicating the state of the image forming apparatus 20.

Next, in step S1002, the agent monitoring unit 3004 determines whether the image forming apparatus 20 that is the status notification transmission source is a registered agent. This determination uses, for example, the agent information stored in the external storage apparatus 304 of the processing server 30 described below. More specifically, whether the agent information illustrated in FIG. 11A includes the agent ID that is received together with the status notification and that is information for identifying the image forming apparatus 20 is checked, and if the agent information includes the agent ID, the agent monitoring unit 3004 determines that the image forming apparatus 20 is registered in the processing server 30.

In step S1002, if the agent monitoring unit 3004 determines that the image forming apparatus 20 that is the status notification transmission source is not a registered agent (NO in step S1002), the processing proceeds to step S1020.

In step S1020, the agent monitoring unit 3004 transmits deregistration information as a response to the image forming apparatus 20, and the agent monitoring unit 3004 ends the processing of the flowchart in FIG. 10. Details of the deregistration information are as described above in the description of step S901.

On the other hand, in step S1002, if the agent monitoring unit 3004 determines that the image forming apparatus 20 that is the status notification transmission source is a registered agent (YES in step S1002), the processing proceeds to step S1003.

In step S1003, the agent monitoring unit 3004 checks whether the received status includes "nearly full". If the agent monitoring unit 3004 determines that the received status includes "nearly full" (YES in step S1003), the processing proceeds to step S1004.

In step S1004, the agent monitoring unit 3004 checks a nearly-full notification flag. Details of the nearly-full notification flag will be described below.

If the agent monitoring unit 3004 determines that the nearly-full notification flag is "undone" (YES in step S1004), the processing proceeds to step S1005.

In step S1005, the agent monitoring unit 3004 issues a request for mail notification for the nearly-full status to prompt the user to solve the nearly-full status. The mail notification may be executed at this time, but in a case in which a plurality of notifications is necessary to be issued, notification items are first gathered as a mail notification request because it is convenient for the user to transmit the notifications together in a single mail.

In step S1006, the agent monitoring unit 3004 sets the nearly-full notification flag to "done", and the processing proceeds to step S1008. The nearly-full notification flag is information managed by the agent monitoring unit 3004 illustrated in FIG. 11 described below and is stored in the RAM 303 or other memories via the setting management unit 3001. The nearly-full notification flag is used to prevent repeated transmission of notifications of the same content in a case in which the agent monitoring unit 3004 transmits a notification to the administrator via the mail control unit 3005.

On the other hand, in step S1004, if the agent monitoring unit 3004 determines that the nearly-full notification flag is "done" (NO in step S1004), the processing proceeds to step S1008.

Further, in step S1003, if the agent monitoring unit 3004 determines that the received status does not include "nearly full" (NO in step S1003), the processing proceeds to step S1007.

In step S1007, the agent monitoring unit 3004 sets the nearly-full notification flag to "undone", and the processing proceeds to step S1008.

In step S1008, the agent monitoring unit 3004 checks whether the received status includes "full". The full notification flag is information managed by the agent monitoring unit 3004 in FIG. 11 and is stored in the RAM 303 via the setting management unit 3001. The full notification flag is used to prevent repeated transmission of notifications of the same content in a case in which the agent monitoring unit 3004 transmits a notification to the administrator via the mail control unit 3005, as in the case of the nearly-full notification flag.

In step S1008, if the agent monitoring unit 3004 determines that the received status includes "full" (YES in step S1008), the processing proceeds to step S1009.

In step S1009, the agent monitoring unit 3004 checks a full notification flag. If the agent monitoring unit 3004 determines that the full notification flag is "undone" (YES in step S1009), the processing proceeds to step S1010.

In step S1010, the agent monitoring unit 3004 issues a request for mail notification for the full status to provide an error notification for "full", as in step S1004.

Next, in step S1011, the agent monitoring unit 3004 sets the full notification flag to "done", and the processing proceeds to step S1013.

On the other hand, in step S1009, if the agent monitoring unit 3004 determines that the full notification flag is "done" (NO in step S1009), the processing proceeds to step S1013.

Further, in step S1008, if the agent monitoring unit 3004 determines that the received status does not include "full" (NO in step S1008), the processing proceeds to step S1012.

In step S1012, the agent monitoring unit 3004 sets the full notification flag to "undone", and the processing proceeds to step S1013.

In step S1013, the agent monitoring unit 3004 checks whether the received status includes "license invalid". A license invalid notification flag is information managed by the agent monitoring unit 3004 in FIG. 11 and is stored in the RAM 303 via the setting management unit 3001. The license invalid notification flag is used to prevent repeated transmission of notifications of the same content in the case in which the agent monitoring unit 3004 transmits a notification to the administrator via the mail control unit 3005, as in the cases of the nearly-full notification flag and the full notification flag.

In step S1013, if the agent monitoring unit 3004 determines that the received status includes "license invalid" (YES in step S1013), the processing proceeds to step S1014.

In step S1014, the agent monitoring unit 3004 checks the license invalid notification flag. If the agent monitoring unit 3004 determines that the license invalid notification flag is "undone" (YES in step S1014), the processing proceeds to step S1015.

In step S1015, the agent monitoring unit 3004 issues a request for mail notification for license update to prompt the user to update the license, as in step S1004.

Next, in step S1016, the agent monitoring unit 3004 sets the license invalid notification flag to "done", and the processing proceeds to step S1018.

On the other hand, in step S1014, if the agent monitoring unit 3004 determines that the license invalid notification flag is "done" (NO in step S1014), the processing proceeds to step S1018.

Further, in step S1013, if agent monitoring unit 3004 determines that the received status does not include "license invalid" (NO in step S1013), the processing proceeds to step S1017.

In step S1017, the agent monitoring unit 3004 sets the license invalid notification flag to "undone", and the processing proceeds to step S1018.

In step S1018, the agent monitoring unit 3004 transmits a required mail via the mail control unit 3005 in response to the mail notification request stored in steps S1005, S1010, and S1015. The mail notification destination designated in advance by the user via the input apparatus 305 on a screen (not illustrated) displayed on the display apparatus 306 is stored in the external storage apparatus 304 and is read by the mail control unit 3005 at the time of mail transmission so that the mail transmission is executed. At this time, if the mail transmission is unsuccessful, the various notification flags may be set to "undone" again.

Next, in step S1019, the agent monitoring unit 3004 stores the settings of the various notification flags and the like in the external storage apparatus 304, and the agent monitoring unit 3004 ends the processing of the flowchart in FIG. 10. Step S1019 may be omitted in a case in which the settings of the notification flags and the like are stored not in the RAM 303 but in the external storage apparatus 304 each time.

FIG. 11A illustrates an example of the agent information held by the processing server 30, and FIG. 11B illustrates an example of an image forming apparatus management screen displayed by the processing server 30.

FIG. 11A illustrates an example of the agent information to which the agent monitoring unit 3004 or the job history management unit 3002 refers or makes a change via the setting management unit 3001. The agent information is image forming apparatus setting information and is stored in the external storage apparatus 304 of the processing server 30 or the database 40.

The agent information includes, for example, following items 1101 to 1109.

An agent ID 1101 is for identifying the image forming apparatus 20. An agent type 1102 is for identifying the agent type. An agent version 1103 is for identifying the agent version. A status 1104 is for displaying the agent status on the display apparatus 306 and notifying the administrator of an error.

A job history transfer schedule 1105 is for displaying, on the display apparatus 306, the transfer schedule of job history transmission from the image forming apparatus 20 to the processing server 30 and for changing it from the input apparatus 305. A time 1106 of the previous heartbeat reception is for managing whether the image forming apparatus 20 is operating normally.

The nearly-full notification flag 1107, a full notification flag 1108, and a license invalid notification flag 1109 are various notification flags for preventing repeated transmission of mail notifications of the same content.

The agent monitoring unit 3004 displays the management screen on the display apparatus 306 so that the setting values of the items 1101 to 1109 are editable by the user via the input apparatus 305.

FIG. 11B illustrates an example of the management screen displayed on the display apparatus 306 of the processing server 30 by the agent monitoring unit 3004. Alternatively, the management screen illustrated as an example in FIG. 11B may be displayed on the display apparatus 306 of the PC 10 that remotely connects to the processing server 30.

The example illustrated in FIG. 11B is a screen of an image forming apparatus management list, and a list of the items illustrated in FIG. 11A, i.e., agent ID, status, and transfer schedule (job history transfer schedule) is displayed for each managed image forming apparatus.

If a link 1201 of the agent ID is clicked, the agent monitoring unit 3004 displays, on the display apparatus 306 of the processing server 30, a screen (not illustrated), separated from the screen, for the user to edit the setting values via the input apparatus 305 of the processing server 30.

The user presses an "delete" button 1202 located rightmost in the list so that the agent monitoring unit 3004 deletes the agent information illustrated in FIG. 11A from the external storage apparatus 304 or the database 40, and thus the image forming apparatus 20 is deleted (deregistered) from the management target.

Figure 12:
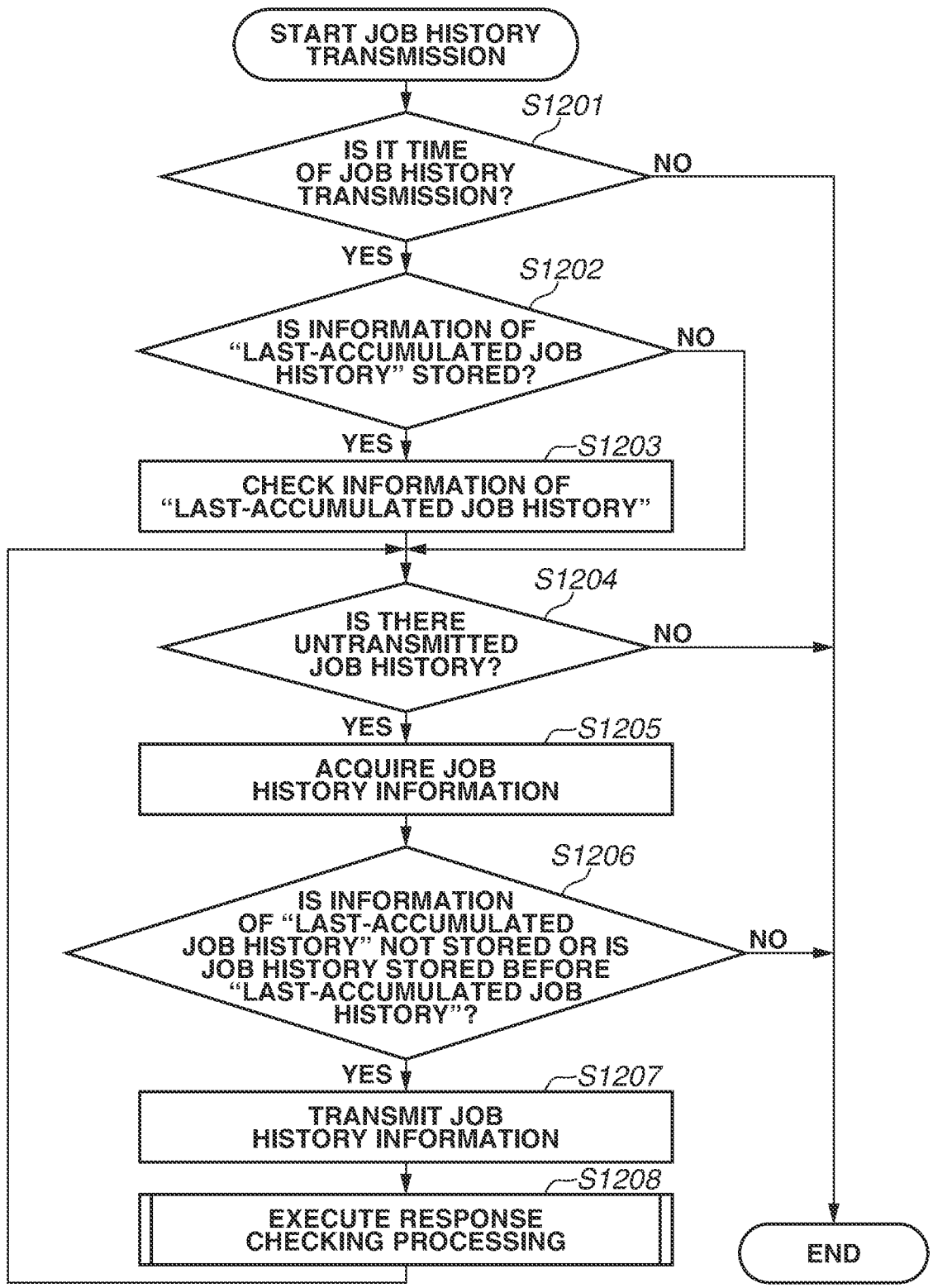
FIG. 12 is a flowchart illustrating job history transmitting processing performed by the image forming apparatus according to the first exemplary embodiment.

FIG. 12 is a flowchart illustrating an example of processing of transmitting a job history stored in the external storage apparatus 204 by the job history management unit 2002 of the image forming apparatus 20 to the processing server 30 via the data transmission/reception unit 2003. The processing is expected to be executed periodically at predetermined intervals according to the job history transfer schedule 7022 of the setting information 702. Further, the process may be executed by a user instruction.

In step S1201, the job history management unit 2002 checks the job history transfer schedule 7022 in FIG. 7 via the setting management unit 2001. If the job history management unit 2002 determines that the current time does not correspond to the job history transmission time (NO in step S1201), the job history management unit 2002 ends the processing of the flowchart in FIG. 12.

On the other hand, if the job history management unit 2002 determines that the current time corresponds to the job history transmission time (YES in step S1201), the processing proceeds to step S1202.

In step S1202, the job history management unit 2002 checks whether the information of the "last-accumulated job history" 7026 stored in step S811 in FIG. 8 is stored (i.e., whether the license is determined valid and the information is not cleared in step S806 in FIG. 8).

If the job history management unit 2002 determines that the information of the "last-accumulated job history" 7026 is stored (YES in step S1202), the processing proceeds to step S1203. This case corresponds to a case in which the license is determined invalid and the information is stored in step S811 in FIG. 8.

In step S1203, the job history management unit 2002 acquires and checks the information of the "last-accumulated job history" 7026 that is stored in the external storage apparatus 204 in step S811 in FIG. 8, and the processing proceeds to step S1204.

On the other hand, in step S1202, if the job history management unit 2002 determines that the information of the "last-accumulated job history" 7026 is not stored (NO in step S1202), the processing proceeds to step S1204. This case corresponds to a case in which the license is determined valid and the information is cleared in step S806 in FIG. 8.

In step S1204, the job history management unit 2002 determines whether there is a job history that is untransmitted to the processing server 30 in the external storage apparatus 204.

If the job history management unit 2002 determines that there is no job history that is untransmitted to the processing server 30 (NO in step S1204), the job history management unit 2002 ends the processing of the flowchart in FIG. 12.

On the other hand, if the job history management unit 2002 determines that there is a job history that is untransmitted to the processing server 30 (YES in step S1204), the processing proceeds to step S1205.

In step S1205, the job history management unit 2002 acquires the untransmitted job history stored in the external storage apparatus 204.

Next, in step S1206, the job history management unit 2002 checks whether the information of the "last-accumulated job history" 7026 is not stored (is empty) or whether the job history acquired in step S1205 is a job history that is stored before the "last-accumulated job history" 7026. The case in which the information of the "last-accumulated job history" 7026 is not stored (is empty) corresponds to a case in which the license is determined valid and the "last-accumulated job history" 7026 is cleared in step S806 in FIG. 8. Further, the information of the "last-accumulated job history" 7026 is stored in step S811 in FIG. 8 in the case in which the license is determined invalid. Thus, the job history that is stored before the "last-accumulated job history" 7026 corresponds to a job history that is recorded while the license is valid. On the other hand, the job history that is stored after the "last-accumulated job history" 7026 corresponds to a job history that is recorded while the license is invalid.

If the job history management unit 2002 determines that the information of the "last-accumulated job history" 7026 is stored and the job history acquired in step S1205 is a job history that is stored after the "last-accumulated job history" 7026 (NO in step S1206), the job history management unit 2002 ends the processing of the flowchart in FIG. 12.

On the other hand, if the job history management unit 2002 determines that the information of the "last-accumulated job history" 7026 is not stored (is empty) or whether the job history acquired in step S1205 is a job history that is stored before the "last-accumulated job history" 7026 (YES in step S1206), the processing proceeds to step S1207.

In step S1207, the job history management unit 2002 transmits the job history acquired in step S1205 to the processing server 30 via the data transmission/reception unit 2003 and receives a response from the processing server 30.

Next, in step S1208, the job history management unit 2002 checks the response received in step S1207 from the processing server 30 via the data transmission/reception unit 2003 (i.e., response checking processing). Details of the response checking processing are already described above with reference to FIG. 9, so that description thereof is omitted. Following the processing in step S1208, the processing returns to step S1204.

As described above, in the image forming apparatus 20 according to the present exemplary embodiment, in the case in which the license is determined to be valid, the job history management unit 2002 outputs, to the processing server 30, the job history that is not output yet. On the other hand, in the case in which the license is determined to be invalid, the job history management unit 2002 outputs the job history recorded while the license is valid to the processing server 30. Further, the image forming apparatus 20 may set the timing at which the license becomes valid to the status 703, and in step S1207, the job history management unit 2002 may output the job history recorded after the license becomes valid to the processing server 30. In this way, in the case in which a license is determined to be valid after the license is determined to be invalid, the job history management unit 2002 can output the job history recorded after the license becomes valid to the processing server 30.

While not illustrated in the present exemplary embodiment, the job history management unit 3002 of the processing server 30 to which the job history is transmitted in step S1207 receives the job history via the data transmission/reception unit 3003 and stores the job history in the external storage apparatus 304. Further, the processing server 30 returns the reception status (including information such as error occurrence information in a case in which an error occurs) as a response to the image forming apparatus 20. Further, in a case in which the history includes image data, the job history management unit 3002 performs image processing on the image and transmits the job history and text information to the database 40 via the data transmission/reception unit 3003.

While the information of the "last-accumulated job history" 7026 is used as the job history ID in the present exemplary embodiment as illustrated in FIG. 7, for example, a time and date of an update of a job history file, an order of storing in the external storage apparatus 304, and the like can be used. In this case, the processing can be executed in such a manner that the processing of step S1207 is executed if the time and date of the update of the job history acquired in step S1205 is before the time and date of the update of the "last-accumulated job history" 7026 in step S1206 in FIG. 12.

FIG. 13 is a flowchart illustrating an example of processing in which the job history management unit 2002 of the image forming apparatus 20 transmits a heartbeat to the processing server 30 via the data transmission/reception unit 2003.

In the job history audit system in the present exemplary embodiment, the image forming apparatus 20 transmits predetermined data (notification) at a predetermined timing to the processing server 30 (heartbeat) so that the processing server 30 can manage the image forming apparatus 20 as appropriate. The transmission data relating to the heartbeat includes identification information with which the image forming apparatus 20 is identifiable. If the processing server 30 confirms that the communication is periodically performed, the processing server 30 can determine that the image forming apparatus 20 is operating normally. This processing is supposed to be executed periodically at predetermined intervals. Further, the processing may be executed unexpectedly by a user instruction.

In step S1301, the job history management unit 2002 checks whether the current time corresponds to the time of heartbeat transmission to the processing server 30. In the present exemplary embodiment, the job history management unit 2002 is supposed to store the time of the previous heartbeat transmission in the RAM 203 and compare the stored time with the current time to determine whether the predetermined time period has elapsed. Alternatively, the time of the previous heartbeat transmission may be stored in the external storage apparatus 204 as part of the setting information in FIG. 7.

If the job history management unit 2002 determines that the current time does not correspond to the time of heartbeat transmission to the processing server 30 (NO in step S1301), the job history management unit 2002 ends the processing of the flowchart in FIG. 13.

On the other hand, in step S1301, if the job history management unit 2002 determines that the current time corresponds to the time of heartbeat transmission to the processing server 30 (YES in step S1301), the processing proceeds to step S1302.

In step S1302, the job history management unit 2002 checks whether the license flag set in step S804 or S809 in FIG. 8 is "valid".

If the job history management unit 2002 determines that the license flag is "invalid" (NO in step S1302), the job history management unit 2002 ends the processing of the flowchart in FIG. 13.

On the other hand, if the job history management unit 2002 determines that the license flag is "valid" (YES in step S1302), the processing proceeds to step S1303.

In step S1303, the job history management unit 2002 transmits a heartbeat to the processing server 30 via the data transmission/reception unit 2003 and receives a response from the processing server 30. The heartbeat is to notify the processing server 30 that the image forming apparatus 20 is operating normally, so that the heartbeat includes at least information with which the image forming apparatus 20 is identifiable.

Next, in step S1304, the job history management unit 2002 checks the response received in step S1303 from the processing server 30 via the data transmission/reception unit 2003 (i.e., response checking processing). Details of the response checking processing are already described above with reference to FIG. 9, so that description thereof is omitted. Following the processing in step S1208, the job history management unit 2002 ends the processing of the flowchart in FIG. 12.

While not described in the present exemplary embodiment, the processing server 30 to which the heartbeat is transmitted in step S1303 receives the heartbeat via the data transmission/reception unit 3003 and identifies the image forming apparatus 20 that is the transmission source. Thereafter, the processing server 30 stores, as the setting information about the image forming apparatus 20, the time of the reception in the time 1106 of the previous heartbeat reception in the agent information in FIG. 11A. Further, the processing server 30 returns the reception status including information such as error occurrence information as a response to the image forming apparatus 20.

Further, the agent monitoring unit 3004 periodically checks the reception time of the previous heartbeat via the setting management unit 3001 and checks whether the difference from the current time does not exceed the predetermined time period, thereby monitoring the operational status of the image forming apparatus 20. If an abnormality is detected in the image forming apparatus 20, a notification of the abnormality is provided to the administrator.

As described above, according to the first exemplary embodiment, a job history accumulated in an image forming apparatus is transmitted to a server before a valid period of a license expires, and a job history accumulated in the image forming apparatus during a time period in which the valid period of the license expires can be set not to be transmitted to the server. Further, in a case in which the free space of a storage apparatus is detected to be insufficient (full) during a time period in which the valid period of the license expires, the job history accumulation can be stopped. Further, the job history accumulation can be stopped at a timing at which a server deregistration is detected in a state in which the valid period of the license expires. Further, the job history accumulated during a time period in which the valid period of the license expires is automatically deleted, so that the system removal can be executed without causing inconvenience to the user.

As a result, an appropriate history management system in an image forming apparatus in a case in which a license expires is provided in consideration of a case in which a user does not intend to continue the use of the job history audit system.

In addition to the configuration of the first exemplary embodiment, a second exemplary embodiment includes a function of transmitting a job history stored in the image forming apparatus 20 immediately after an event notification that the license is invalid is detected. Now, this exemplary embodiment will be described. Only the differences from the first exemplary embodiment will be described below.

Processing of the image forming apparatus 20 according to the second exemplary embodiment will be described with reference to flowcharts in FIGS. 14 and 15. The CPU 201 of the image forming apparatus 20, for example, reads a program stored in the ROM 202 onto the RAM 203 and executes the program to implement the processing in the flowcharts in FIGS. 14 and 15.

Figure 14:
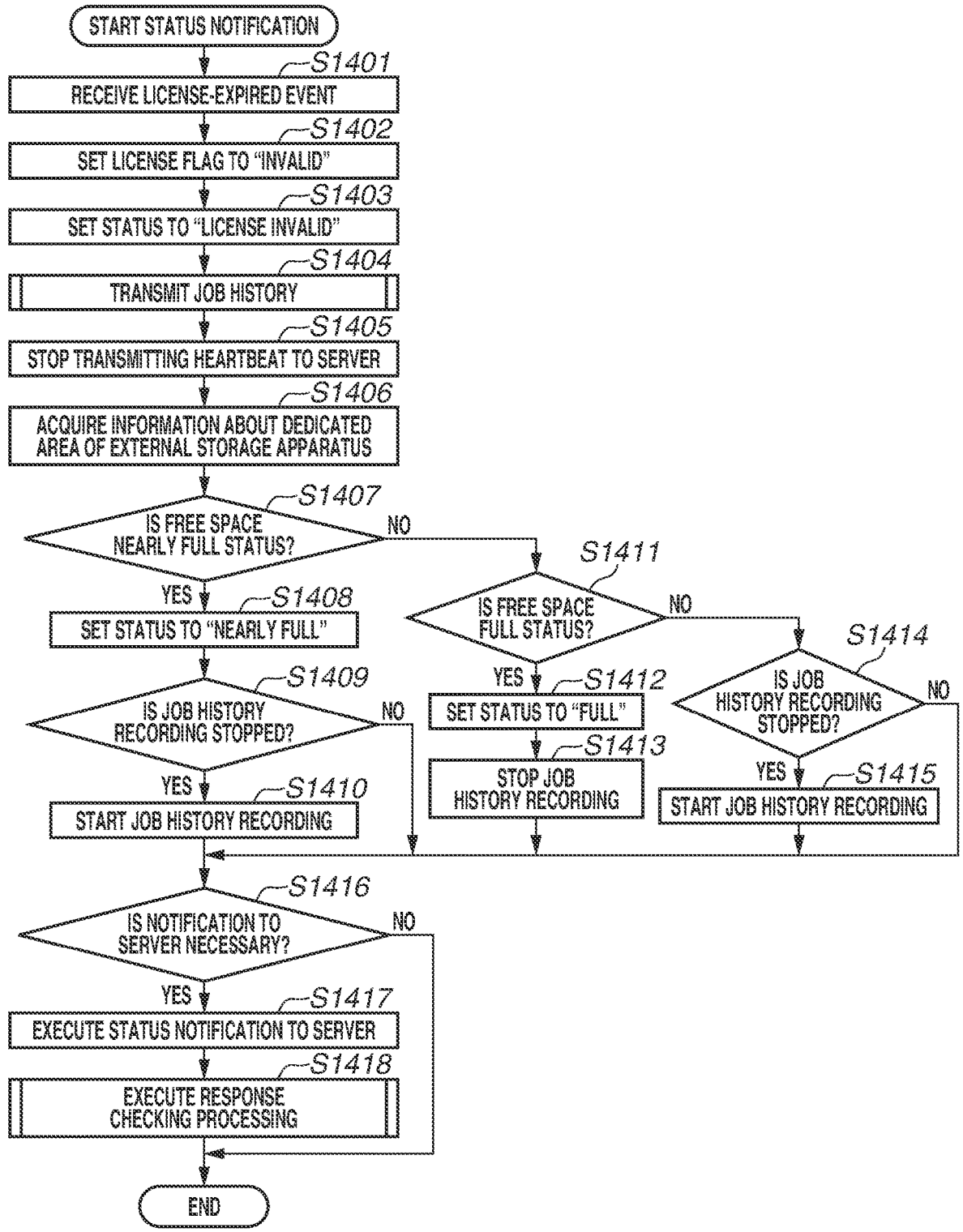
FIG. 14 is a flowchart illustrating status notification processing according to a second exemplary embodiment.

FIG. 14 is a flowchart illustrating an example of a processing in a case in which the job history management unit 2002 of the image forming apparatus 20 in the second exemplary embodiment receives a license-invalid event via the license management unit 2005. This processing is premised on that the license-invalid event is received via the license management unit 2005, and this makes it possible to recognize a change of the license in more real time. Thus, it is recognized that the job history that is already stored in the external storage apparatus 204 is stored while the license is valid, so that the storing of the information of the "last-accumulated job history" as in step S811 in FIG. 8 in the first exemplary embodiment is unnecessary.

The processing in FIG. 8 according to the first exemplary embodiment and the processing in FIG. 14 according to the second exemplary embodiment can be executed simultaneously.

In step S1401, the job history management unit 2002 receives a license-invalid event via the license management unit 2005. The license-invalid event may be received by the license management unit 2005 from the license server 60. Alternatively, the license management unit 2005 may acquire information about the valid period of the license in advance from the license server 60, and the license management unit 2005 may count down to the expiration date. In this case, the license management unit 2005 executes event notification to the job history management unit 2002 at a timing at which the license becomes invalid.

Next, in step S1402, the job history management unit 2002 sets the value of the license flag to "invalid" as in step S809 in FIG. 8 and stores the set value in the RAM 203 or the external storage apparatus 204.

Further, in step S1403, the job history management unit 2002 sets the status 703 to "license invalid" illustrated in FIG. 7 as in step S810 in FIG. 8.

Next, in step S1404, the job history management unit 2002 transmits a job history to the processing server 30 via the data transmission/reception unit 2003. Details of the processing performed in step S1404 will be described below with reference to FIG. 15.

Step S1405 and the subsequent steps are similar to step S812 and the subsequent steps in FIG. 8, so that description thereof is omitted.

Figure 15:
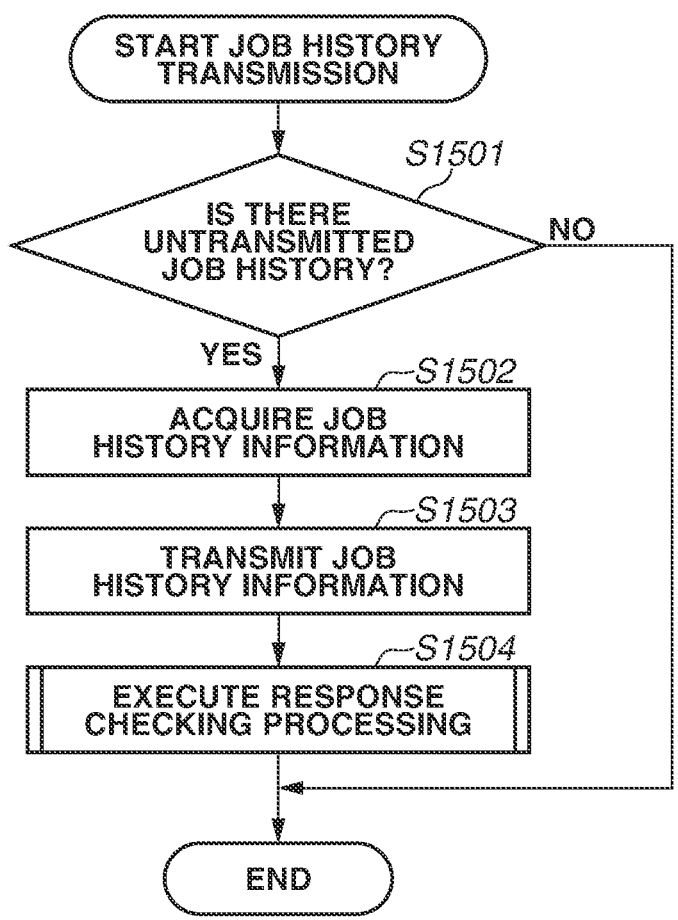
FIG. 15 is a flowchart illustrating job history transmitting processing according to the second exemplary embodiment.

FIG. 15 is a flowchart illustrating processing in which the job history management unit 2002 of the image forming apparatus 20 according to the second exemplary embodiment transmits a job history stored in the external storage apparatus 204 to the processing server 30 via the data transmission/reception unit 2003 in step S1404 in FIG. 14.

In step S1501, the job history management unit 2002 checks whether there is a job history that is untransmitted to the processing server 30 in the external storage apparatus 204, as in step S1204 in FIG. 12.

If the job history management unit 2002 determines that there is no job history that is untransmitted to the processing server 30 (NO in step S1501), the job history management unit 2002 ends the processing of the flowchart in FIG. 15.

On the other hand, if the job history management unit 2002 determines that there is a job history that is untransmitted to the processing server 30 (YES in step S1501), the processing proceeds to step S1502.

In step S1502, the job history management unit 2002 acquires the untransmitted job history stored in the external storage apparatus 204, as in step S1205 in FIG. 12.

Next, in step S1503, the job history management unit 2002 transmits the job history acquired in step S1502 to the processing server 30 via the data transmission/reception unit 2003 and receives a response from the processing server 30, as in step S1207 in FIG. 12.

Next, in step S1504, the job history management unit 2002 checks the response received in step S1503 from the processing server 30 via the data transmission/reception unit 2003, as in step S1208 in FIG. 12, and the job history management unit 2002 ends the processing of the flowchart in FIG. 15. Details of the response checking processing in step S1504 are illustrated in FIG. 9.

As described above, according to the second exemplary embodiment, in a case in which a license of an image forming apparatus becomes invalid, a job history accumulated during a time period in which the license is valid is promptly transmitted to a server.

As described above, according to each of the exemplary embodiments, an appropriate history information management system in an image forming apparatus in a case in which a license expires is provided in consideration of a case in which the user does not intend to continue the use of the license.

The configuration and contents of the various data described above are not limited thereto and can be various configurations and contents suitable for the intended use or purpose.

While the exemplary embodiments are described above, the present disclosure can be implemented as, for example, a system, apparatus, method, program, and storage medium. Specifically, the present disclosure is applicable to a system including a plurality of devices or to an apparatus including a single device.

Further, every combination of the above-described exemplary embodiments is also encompassed within the scope of the disclosure.

OTHER EMBODIMENTS

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2018-013528, filed Jan. 30, 2018, which is hereby incorporated by reference herein in its entirety.

What is claimed is:

1. An image processing apparatus that executes a job relating to image processing and stores a log indicating a processing content of the job in a storage area of a storage apparatus when the job is executed, the image processing apparatus comprising:
   a memory storing instructions related to an application for outputting the log stored in the storage area, and
   at least one processor executing the instructions causing the image processing apparatus to:
   determine whether a license of the application is valid;
   transmit a notification to a server at a predetermined period or frequency to cause the server to determine an operating state of the image processing apparatus or the application in a case where the license is determined to be valid;
   output a log of an output target to an external system among logs stored in the storage area in a case where the license is determined to be valid;
   stop transmitting the notification to the server during a time period from when the license is determined to be invalid to when the license is determined to be valid; and
   output, to the external system, a log that is not output but is stored in the storage area while the license that has determined to be invalid is valid whereas a log that is stored in the storage area while the license is invalid is not output to the external system in a case where the license is determined to be invalid.

2. The image processing apparatus according to claim 1, wherein in the case where the license is determined to be valid, the log is output according to a predetermined schedule, and
   wherein in the case where the license is determined invalid, the log that is not output and is stored in the storage area while the license that has determined to be invalid is valid is output to the external system according to the schedule.

3. The image processing apparatus according to claim 1, wherein even in a case where the license is determined to be invalid, a log that is a candidate for the output target relating to the job is stored in the storage area when the job is executed.

4. The image processing apparatus according to claim 1, wherein the instructions further cause the image processing apparatus to stop recording the log that is a candidate for the output target in the storage area in a case where the storage area does not have an amount of free space required to store the log.

5. The image processing apparatus according to claim 1, wherein the instructions further cause the image processing apparatus to delete the log that is stored in the storage area in a case where the license is determined to be invalid and the image processing apparatus is deregistered from the server.

6. The image processing apparatus according to claim 1, wherein the instructions further cause the image processing apparatus to stop storing a new log that is a candidate for the output target in the storage area in a case where the image processing apparatus is deregistered from the server.

7. The image processing apparatus according to claim 6, wherein the instructions further cause the image processing apparatus to stop storing the log in the storage area in a case where the license is determined to be invalid and the image processing apparatus is deregistered from the server.

8. The image processing apparatus according to claim 1, wherein the instructions further cause the image processing apparatus to output the log that is not output and is stored in the storage area to the external system in a case where the image processing apparatus is deregistered from the server.

9. A method for controlling an image processing apparatus that executes a job relating to image processing and stores a log indicating a processing content of the job in a storage area of a storage apparatus when the job is executed, the method comprising:
determining whether a license of an application for outputting the log stored in the storage area is valid;
transmitting a notification to a server at a predetermined period or frequency to cause the server to determine an operating state of the image processing apparatus or the application in a case where the license is determined to be valid;
outputting a log of an output target to an external system among logs stored in the storage area in the case where the license is determined to be valid;
stopping transmitting the notification to the server during a time period from when the license is determined to be invalid to when the license is determined to be valid; and
outputting, to the external system, a log that is not output but is stored in the storage area while the license that has determined to be invalid is valid whereas the log that is stored in the storage area while the license is invalid is not output to the external system in a case where the license is determined to be invalid.

10. A non-transitory computer-readable storage medium on which is stored a computer program for making a computer execute a control method for an image processing apparatus that executes a job relating to image processing and stores a log indicating a processing content of the job in a storage area of a storage apparatus when the job is executed, the method comprising:
determining whether a license of an application for outputting the log stored in the storage area is valid;
transmitting a notification to a server at a predetermined period or frequency to cause the server to determine an operating state of the image processing apparatus or the application in a case where the license is determined to be valid;
outputting a log of an output target to an external system among logs stored in the storage area in the case where the license is determined to be valid;
stopping transmitting the notification to the server during a time period from when the license is determined to be invalid to when the license is determined to be valid; and
outputting, to the external system, a log that is not output and is stored in the storage area while the license that has determined to be invalid is valid whereas the log that is stored in the storage area while the license is invalid is not output to the external system in a case where the license is determined to be invalid.

11. An image processing apparatus that executes a job relating to image processing and stores a log indicating a processing content of the job in a storage area of a storage apparatus when the job is executed, the image processing apparatus comprising:
a memory storing instructions related to an application for outputting the log stored in the storage area, and
at least one processor executing the instructions causing the image processing apparatus to:
transmit a notification to a server at a predetermined period or frequency to cause the server to determine an operating state of the image processing apparatus or the application;
output a log of an output target to an external system among logs stored in the storage apparatus;
delete information of the server set as a transmission destination of the notification in a case where the image processing apparatus is deregistered from the server; and
stop storing a new log that is a candidate for the output target in the storage area in the case where the image processing apparatus is deregistered from the server.

12. A method for controlling an image processing apparatus that executes a job relating to image processing and stores a log indicating a processing content of the job in a storage area of a storage apparatus when the job is executed, the method comprising:
transmitting, by an application for outputting the log stored in the storage area a notification to a server at a predetermined period or frequency to cause the server to determine an operating state of the image processing apparatus or the application;
outputting a log of an output target to an external system among logs stored in the storage apparatus;
deleting information of the server set as a transmission destination of the notification in a case where the image processing apparatus is deregistered from the server; and
stopping storing a new log that is a candidate for the output target in the storage area in the case where the image processing apparatus is deregistered from the server.

* * * * *